US011754150B2

(12) United States Patent
Dong et al.

(10) Patent No.: US 11,754,150 B2
(45) Date of Patent: Sep. 12, 2023

(54) BELT DRIVEN SYSTEM AND TENSIONER THEREOF

(71) Applicant: ZHEJIANG DAHUA TECHNOLOGY CO., LTD., Zhejiang (CN)

(72) Inventors: Liang Dong, Hangzhou (CN); Shuxin Shuai, Hangzhou (CN); Zhanyan Wen, Hangzhou (CN); Enqi Liu, Hangzhou (CN); Hanhui Xu, Hangzhou (CN); Zhengchun Luo, Hangzhou (CN); Yanhui Liu, Hangzhou (CN); Hangqi Sun, Hangzhou (CN); Shugang Wang, Hangzhou (CN); Guoqiang Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 830 days.

(21) Appl. No.: 16/693,887

(22) Filed: Nov. 25, 2019

(65) Prior Publication Data
US 2020/0088275 A1 Mar. 19, 2020

Related U.S. Application Data

(63) Continuation of application No. PCT/CN2018/082268, filed on Apr. 9, 2018.

(30) Foreign Application Priority Data

May 25, 2017 (CN) .......................... 201720595658.0
May 26, 2017 (CN) .......................... 201720604820.0
(Continued)

(51) Int. Cl.
*F16H 7/14* (2006.01)
*F16H 7/08* (2006.01)
(Continued)

(52) U.S. Cl.
CPC ................ *F16H 7/14* (2013.01); *F16H 7/02* (2013.01); *F16H 7/08* (2013.01); *F16H 7/10* (2013.01);
(Continued)

(58) Field of Classification Search
CPC ..... F16H 7/00; F16H 7/02; F16H 7/08; F16H 2007/0802; F16H 2007/0842;
(Continued)

(56) References Cited

U.S. PATENT DOCUMENTS 793,227 A * 6/1905 Richards ................... F16H 7/14
474/146
1,507,238 A * 9/1924 Kocourek ................ F16H 7/14
474/113
(Continued)

FOREIGN PATENT DOCUMENTS

CN  205204036 U  5/2016
CN  205381648 U  7/2016
(Continued)

OTHER PUBLICATIONS

The Extended European Search Report in European Application No. 18805993.5 dated Aug. 25, 2020, 11 pages.
(Continued)

*Primary Examiner* — Michael R Mansen
*Assistant Examiner* — Raveen J Dias
(74) *Attorney, Agent, or Firm* — METIS IP LLC

(57) ABSTRACT

The present disclosure relates to a belt driven system. The belt driven system may include a master pulley, a slave pulley, a belt around the master pulley and the slave pulley, a tension pulley configured to tension the belt, and a position adjusting device configured to automatically adjust a position of the tension pulley based on an interaction of the tension pulley and the belt.

6 Claims, 24 Drawing Sheets

(30) Foreign Application Priority Data

| May 27, 2017 | (CN) | 201720610712.4 |
| Jul. 4, 2017 | (CN) | 201720801864.2 |
| Jul. 28, 2017 | (CN) | 201720937293.5 |
| Sep. 30, 2017 | (CN) | 201721280547.7 |

(51) Int. Cl.
- *F16H 7/02* (2006.01)
- *F16H 7/12* (2006.01)
- *F16H 7/10* (2006.01)
- *F16H 55/36* (2006.01)

(52) U.S. Cl.
CPC ......... *F16H 7/1254* (2013.01); *F16H 7/1281* (2013.01); *F16H 2007/088* (2013.01); *F16H 2007/0865* (2013.01); *F16H 2007/0876* (2013.01); *F16H 2007/0893* (2013.01); *F16H 2055/366* (2013.01)

(58) Field of Classification Search
CPC ..... F16H 2007/0844; F16H 2007/0846; F16H 2007/0857; F16H 2007/0863; F16H 2007/0865; F16H 2007/0868; F16H 2007/0876; F16H 2007/088; F16H 2007/0893; F16H 2007/0887; F16H 7/10; F16H 7/12; F16H 7/1263; F16H 7/1281; F16H 7/14; F16H 2007/0819; F16H 7/081; F16H 55/36; F16H 2055/366; F16H 55/42; F16H 55/44; F16H 55/48; F16H 55/52; F16H 55/563; F16H 7/1254

See application file for complete search history.

(56) References Cited

U.S. PATENT DOCUMENTS

| | | | | |
|---|---|---|---|---|
| 1,632,261 A * | 6/1927 | Woodrow | | F16H 7/14 248/666 |
| 1,802,485 A * | 4/1931 | Smith | | F25D 23/006 248/666 |
| 2,204,943 A * | 6/1940 | Mercer | | F16H 7/14 123/195 E |
| 2,961,208 A * | 11/1960 | Luenberger | | F16H 7/14 248/662 |
| 3,306,121 A * | 2/1967 | Jenkins | | F01P 5/04 474/117 |
| 3,872,801 A * | 3/1975 | Weddendorf | | E04H 3/04 211/1.52 |
| 3,922,927 A * | 12/1975 | Shiki | | F02B 67/06 474/113 |
| 4,240,368 A * | 12/1980 | Adams | | D05B 69/12 474/86 |
| 4,452,418 A * | 6/1984 | Urushihara | | B60H 1/00521 248/666 |
| 4,512,752 A * | 4/1985 | Brenneman | | F16H 7/14 474/133 |
| 4,583,961 A * | 4/1986 | Kawasawa | | F16H 7/14 474/133 |
| 4,631,044 A * | 12/1986 | Redmon | | F16H 7/14 248/656 |
| 4,789,127 A | 12/1988 | Gleason, Jr. et al. | | |
| 5,184,714 A | 2/1993 | Tapp | | |
| 5,938,169 A * | 8/1999 | Ogawa | | F02B 67/06 123/195 A |
| 6,050,915 A * | 4/2000 | Walworth | | F16H 7/14 474/101 |
| 6,062,279 A * | 5/2000 | Chen | | F16H 7/14 144/130 |
| 6,705,581 B2 * | 3/2004 | Trago | | F16H 7/14 248/656 |
| 7,637,348 B2 * | 12/2009 | Namgung | | B62D 5/0424 180/443 |
| 8,721,479 B2 * | 5/2014 | Hoeting | | F16H 7/14 192/56.1 |
| 9,476,244 B2 * | 10/2016 | Miller | | E06B 3/4636 |
| 9,739,349 B2 * | 8/2017 | Gergis | | F16H 7/08 |
| 2002/0175264 A1 | 11/2002 | Trago et al. | | |
| 2005/0079939 A1 * | 4/2005 | Simmons | | F16H 7/14 474/101 |
| 2007/0163529 A1 * | 7/2007 | Hartmann | | F01L 1/02 123/90.31 |
| 2009/0023526 A1 * | 1/2009 | Larouche | | F16H 7/14 474/101 |
| 2009/0111630 A1 * | 4/2009 | Kume | | F16H 7/14 474/133 |
| 2009/0191069 A1 * | 7/2009 | Dubensky | | F04D 29/601 417/362 |
| 2011/0165980 A1 * | 7/2011 | Hoeting | | F16H 7/14 254/98 |
| 2016/0031233 A1 | 2/2016 | Ito et al. | | |
| 2016/0040759 A1 * | 2/2016 | Gergis | | F16H 7/1281 474/101 |
| 2017/0082177 A1 * | 3/2017 | Manzoor | | F16H 7/20 |
| 2018/0327955 A1 * | 11/2018 | Shimada | | D06F 37/30 |
| 2020/0340553 A1 * | 10/2020 | Salunkhe | | F16H 7/1281 |
| 2020/0340554 A1 * | 10/2020 | Salunkhe | | F16H 7/1281 |
| 2020/0355246 A1 * | 11/2020 | Vegh | | B65G 23/44 |
| 2021/0033172 A1 * | 2/2021 | Chi | | F16H 7/02 |
| 2021/0190334 A1 * | 6/2021 | Willey | | F24F 3/044 |

FOREIGN PATENT DOCUMENTS

| | | | | |
|---|---|---|---|---|
| CN | 105840750 A | * | 8/2016 | ............. F16H 7/02 |
| CN | 106697802 A | | 5/2017 | |
| CN | 207016023 U | | 2/2018 | |
| CN | 207018453 U | | 2/2018 | |
| CN | 207111858 U | | 3/2018 | |
| DE | 9308101 U1 | | 10/1994 | |
| DE | 69408254 T2 | | 8/1998 | |
| DE | 102009057440 A1 | | 6/2011 | |

OTHER PUBLICATIONS

International Search Report in PCT/CN2018/082268 dated Jul. 5, 2018. 5 pages.

Written Opinion in PCT/CN2018/082268 dated Jul. 5, 2018, 5 pages.

\* cited by examiner

400

400

500

BELT DRIVEN SYSTEM AND TENSIONER THEREOF

CROSS REFERENCE TO RELATED APPLICATIONS

This application is a Continuation of International Application No. PCT/CN2018/082268 filed on Apr. 9, 2018 which claims priority of Chinese Patent Application No. 201720595658.0, filed on May 25, 2017, Chinese Patent Application No. 201720604820.0, filed on May 26, 2017, Chinese Patent Application No. 201720610712.4, filed on May 27, 2017, Chinese Patent Application No. 201720801864.2, filed on Jul. 4, 2017, Chinese Patent Application No. 201720937293.5, filed on Jul. 28, 2017, and Chinese Patent Application No. 201721280547.7, filed on Sep. 30, 2017. The contents of above applications are hereby incorporated by reference.

TECHNICAL FIELD

The present disclosure generally relates to the field of mechanical transmission, and more particularly, relates to a belt driven system and tensioner thereof.

BACKGROUND

Belt driven system has a wide range of application in a plurality of devices, such as a ball camera, an automobile engine, a cutting machine, a mechanical arm, or the like. FIG. 1A is a belt driven system of prior art. The belt driven system includes a master pulley 111, a motor 112, a slave shaft 121, a slave pulley 122, a belt 130, and a tension pulley 140. The motor 112 may drive the master pulley 111 to rotate, the rotation of the master pulley 111 may be transmitted to the slave pulley 122 via the belt 130, and the slave pulley 122 may be driven to rotate. The slave pulley 122 may drive the slave shaft 121 to rotate. In order to prevent the belt 130 from slipping for being too loose or from breakage for being over tensioned, as shown in FIG. 1, it is necessary to set the belt to be a little loose and to provide the belt with a tension pulley 140 on a side surface of the belt. The tension degree of the tension pulley 140 may be adjusted by adjusting a position of the tension pulley. Therefore, a tension pulley may be needed in the belt driven system, which may lead to a more complex structure of the belt driven system, difficult assembling, and a higher cost.

FIG. 1B is another belt driven system of prior art. The motor 103 is fixed to a motor fixing plate 102 by one or more screws. When mounting the belt 104, the relative position of the motor 103 and the slave pulley 101 may be adjusted via a waist-shaped hole on the motor fixing plate 104, so as to change the center distance between the motor 103 and the slave pulley 101 and to tension the belt 104. Synchronous belt driven system has many advantages. However, with usage of the belt 104, a high installation precision and a strict center distance are required. Since the tension force of the belt 104 is generally controlled by an assembler, belts of a plurality of devices may have different tension states, and if a belt is over-tensioned, its aging and slacking may be accelerated. In addition, the belt 104 may slack after a long time of operation under an overload. When the belt 104 slacks, most of the structural members of the belt driven system may need to be disassembled to readjust the center distance between the motor 103 and the slave pulley 101. Therefore, it is difficult to maintain the belt and the maintenance cycle of the belt is short.

FIG. 2 is another belt driven system of prior art including a belt tensioner. The belt driven system includes a master pulley 201a, a slave pulley 201b, a first frame 202, a belt 203, a steering pulley 204, a second frame 205, a sliding rail 206, a tension pulley 207, a slidable base 208, and an adjustment screw 209. The tension pulley 207 may be installed on the slidable base 208, and the slidable base 208 can drive the tension pulley 207 to slide on the sliding rail 206 so as to tension the belt 203. However, the belt tensioner includes a plurality of components, occupies a large space, and has a complicated structure.

Therefore, it is desirable to develop a simple structured belt driven system that can overcome the shortcomings mentioned above.

SUMMARY

One aspect of the present disclosure relates to a belt driven system. The belt driven system may include a master pulley, a slave pulley, a belt around the master pulley and the slave pulley, a tension pulley configured to tension the belt, and a position adjusting device configured to automatically adjust a position of the tension pulley based on an interaction of the tension pulley and the belt.

Another aspect of the present disclosure relates to a belt driven system. The belt driven system may include a tensioner for tensioning a belt. The tensioner for tensioning the belt may include a fixing post, and an elastic pressure member fixed on the fixing post, wherein the elastic pressure member elastically may press against a motor of the system.

A further aspect of the present disclosure relates to a belt driven system. The belt driven system may include a tensioner for tensioning a belt. The tensioner for tensioning the belt may include a base and a motor mounting bracket fixed on the base and configured to pivotally mount a motor via a pivot shaft and lock the motor via at last one tension screw, wherein the pivot shaft may be parallel to a central axis of the motor, the tension screw may be screwed towards the motor, an end of the tension screw may press against a side wall of the motor, and the motor may pivot away from a slave pulley of the belt driven system around the pivot shaft upon the tension screw being tensioned.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant application. However, it should be apparent to those skilled in the art that the present application may be practiced without such details. In other instances, well known methods, procedures, systems, components, and/or circuitry have been described at a relatively high-level, without detail, in order to avoid unnecessarily obscuring aspects of the present application. Various modifications to the disclosed embodiments will be readily apparent to those skilled in the art, and the general principles defined herein may be applied to other embodiments and applications without departing from the spirit and scope of the present application. Thus, the present application is not limited to the embodiments shown, but to be accorded the widest scope consistent with the claims.

An aspect of the present disclosure relates to a belt driven system. The belt driven system may include a motor, a master pulley, a slave pulley, and a belt. The belt driven system of the present disclosure may include a separate bet tensioner. The belt tensioner may include a tension pulley and a position adjusting device. The tension pulley may be configured to tension the belt by pressing against the belt. The position adjusting device may be configured to adjust a position of the tension pulley. The slave pulley may further include an elastic part. The elastic part may deform under a tension force applied by the belt to allow the slave pulley to move towards the master pulley, and the elastic part may recover and allow the slave pulley to move away from the master pulley. When the outer periphery of the slave pulley approaches the master pulley, the belt may be tensioned.

For illustration purposes, the following description is provided to help better understanding a segmentation process. It is understood that this is not intended to limit the scope of the present disclosure. For persons having ordinary skills in the art, a certain amount of variations, changes and/or modifications may be deducted under guidance of the present disclosure. Those variations, changes and/or modifications do not depart from the scope of the present disclosure.

Figure 1A:
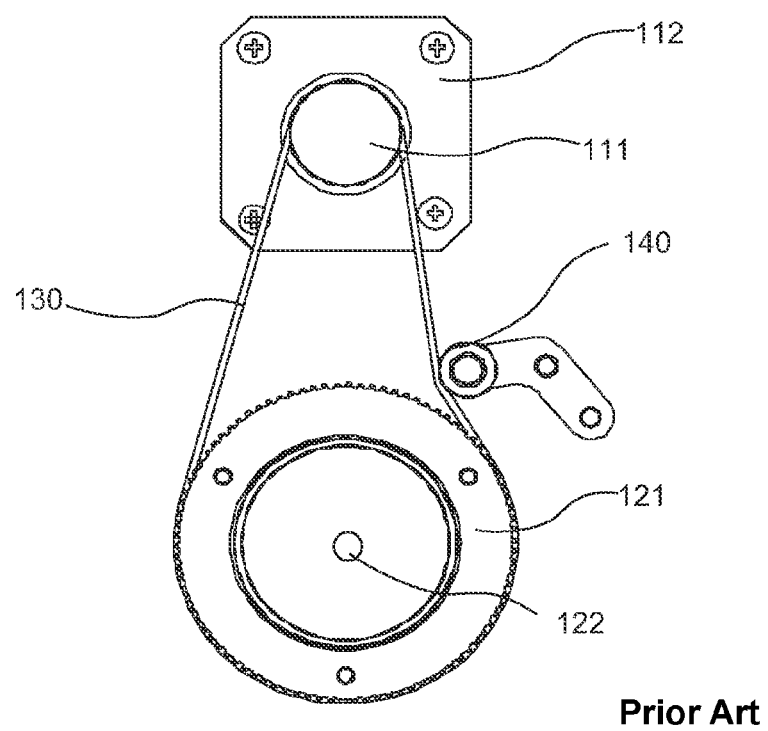
FIG. 1A is a belt driven system of prior art.
Figure 1B:
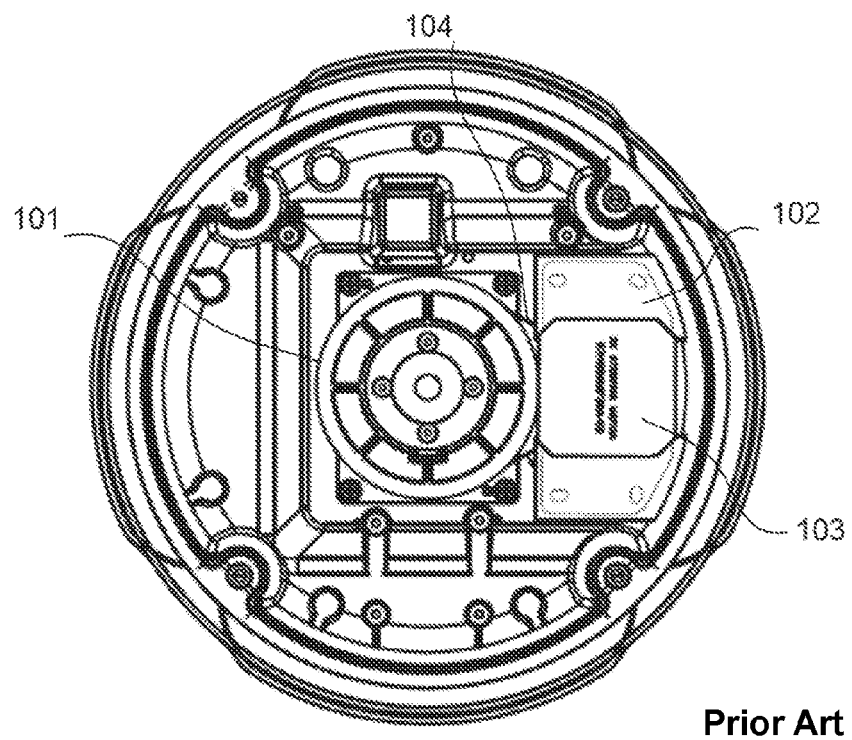
FIG. 1B is another belt driven system of prior art.
Figure 2:
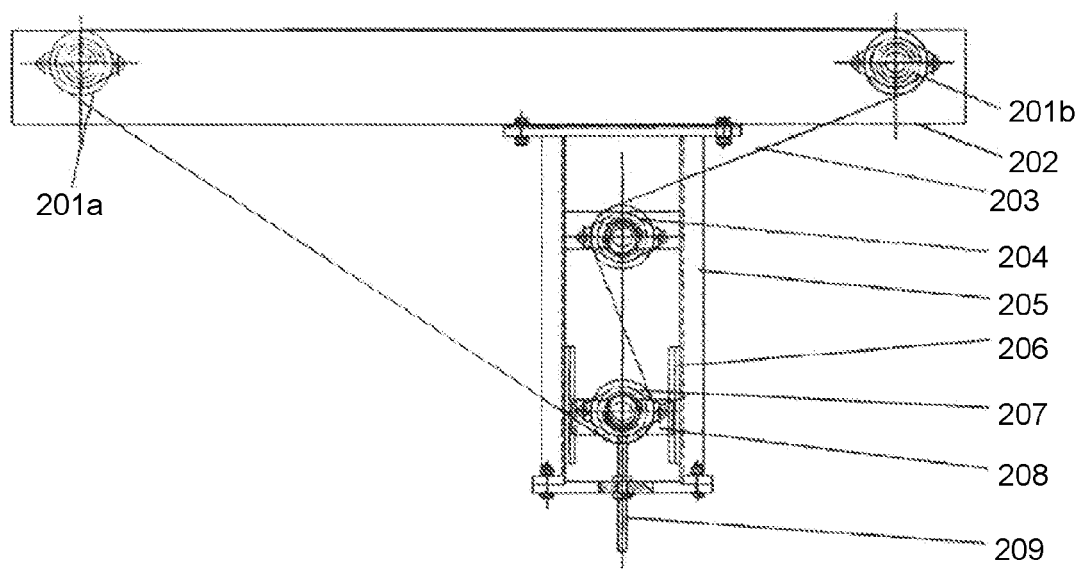
FIG. 2 is another belt driven system of prior art including a belt tensioner.
Figure 3:
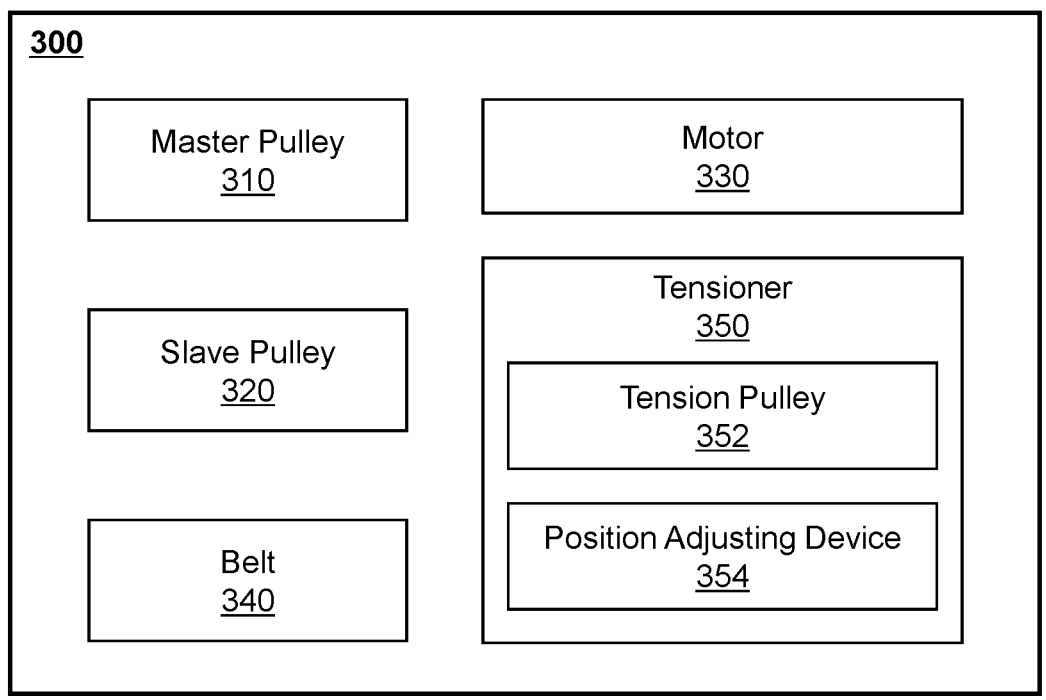
FIG. 3 is a schematic diagram of an exemplary belt driven system according to some embodiments of the present disclosure.

FIG. 3 is a schematic diagram of an exemplary belt driven system 300 according to some embodiments of the present disclosure. The belt driven system 300 may include a master pulley 310, a slave pulley 320, a motor 330, and a belt 340. The master pulley 310 may be configured to rotate around a first rotation axis. The slave pulley 320 may be configured to rotate around a second rotation axis. The motor 330 may be configured to drive the master pulley 310. The belt 340 may be configured to connect an outer periphery of the master pulley 310 and an outer periphery of the slave pulley 320. In some embodiments, a rotation of the master pulley 310 driven by the motor 330 may provide a driving force to the slave pulley 320 via the belt 340, so that the slave pulley 320 may rotate with the master pulley 310. In some embodiments, the rotation of the master pulley 310 and the slave pulley 320 may be synchronous. In some embodiments, a tension force of the belt 340 may be adjusted by the slave pulley 320, as shown in FIGS. 4A-4E. More descriptions of the master pulley 310, the slave pulley 320, the motor 330, and the belt 340 may be found elsewhere in the present disclosure (e.g., FIGS. 4A-4E, 7A-7C, 8A, and 9A-9B and the descriptions thereof).

In some embodiments, the belt driven system 300 may further include a tensioner 350. The tensioner 350 may be configured to tension the belt 340. In some embodiments, the tensioner 350 may include a tension pulley 352 and a position adjusting device 354. The tension pulley 352 may be configured to tension the belt 340 by pressing against the belt 340. The position adjusting device 354 may be configured to adjust a position of the tension pulley 352. In some embodiments, the position adjusting device 354 may adjust the position of the tension pulley 352 automatically. In some embodiments, the position adjusting device 354 may adjust the position of the tension pulley 352 based on an interaction of the tension pulley 352 and the belt 340. More descriptions of the position adjusting device 354 may be found elsewhere in the present disclosure (e.g., FIGS. 5A-5D, 6A-6D, 8A-8E, and 10A-10F and the descriptions thereof).

Figure 4A:
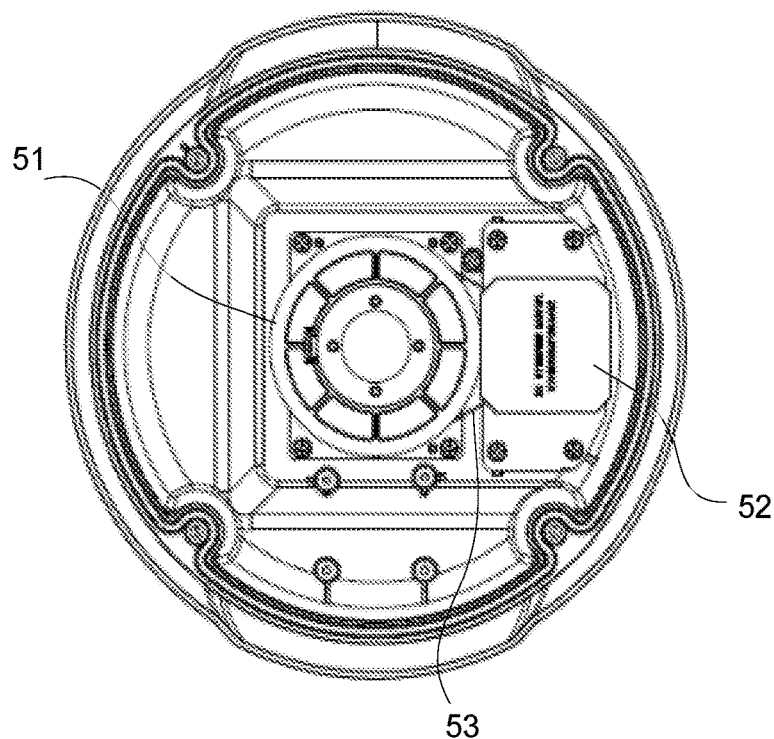
FIG. 4A is a schematic diagram of a belt driven system according to some embodiments of the present disclosure.
Figure 4B:
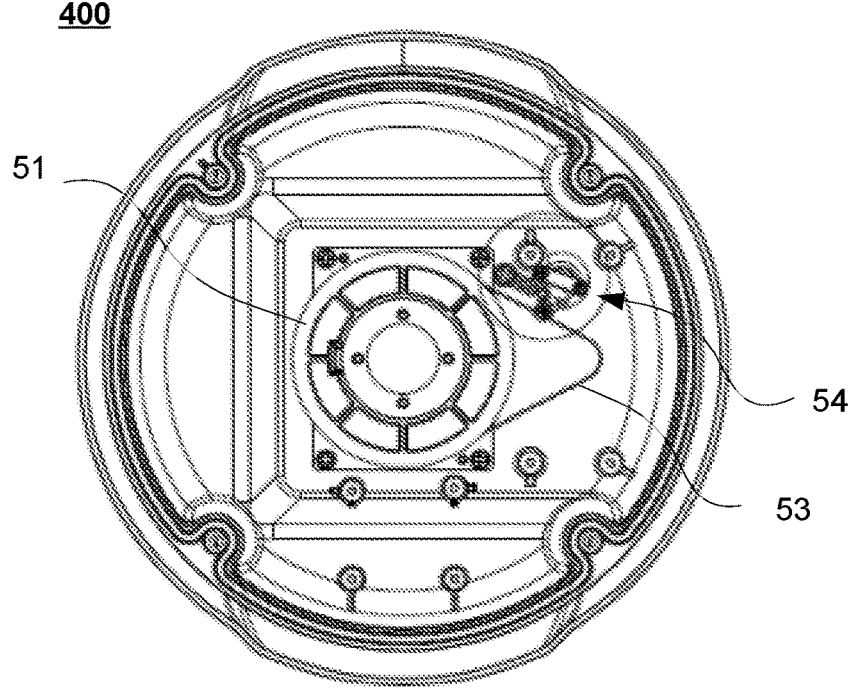
FIG. 4B is a schematic diagram of a belt driven system according to some embodiments of the present disclosure.
Figure 4C:
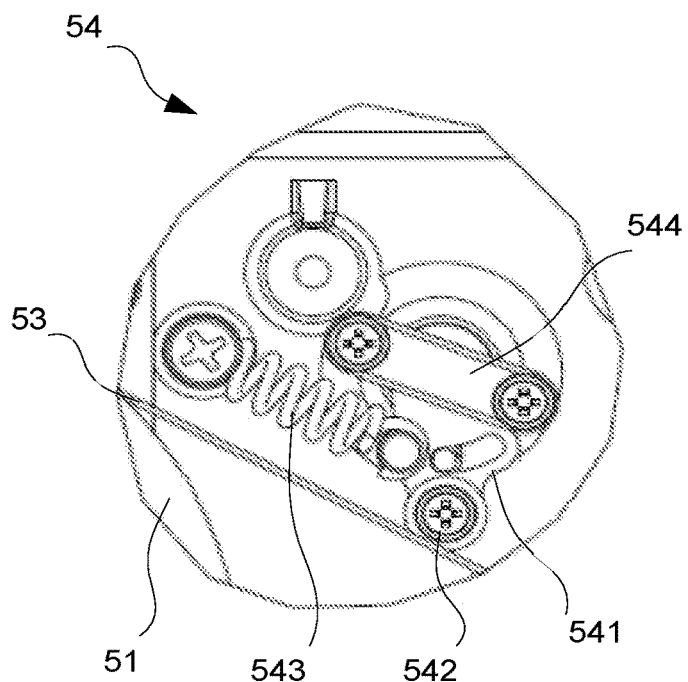
FIG. 4C is a schematic diagram of a belt tensioner according to some embodiments of the present disclosure.
Figure 4D:
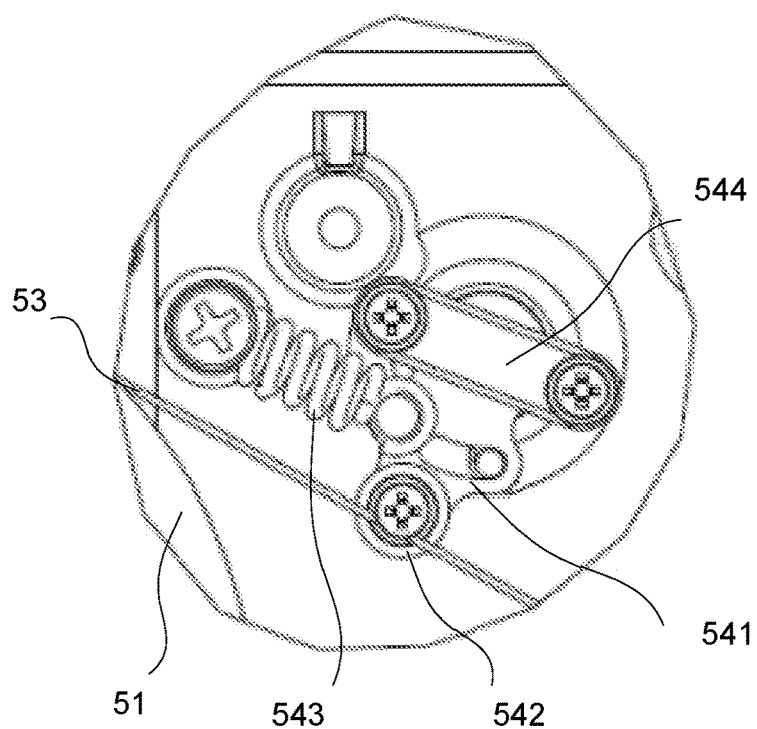
FIG. 4D is a schematic diagram of a belt tensioner according to some embodiments of the present disclosure.

FIGS. 4A-4D illustrate an exemplary belt driven system 400 with a belt tensioner according to some embodiments of the present disclosure. FIG. 4A is a schematic diagram of a belt driven system 400 according to some embodiments of the present disclosure. FIG. 4B is a schematic diagram of a belt driven system 400 according to some embodiments of the present disclosure. FIG. 4C is a schematic diagram of a belt tensioner 54 according to some embodiments of the present disclosure. FIG. 4D is a schematic diagram of a belt tensioner 54 according to some embodiments of the present disclosure.

In some embodiments, as shown in FIGS. 4A and 4B, the belt driven system 400 may include a shell, a motor 52 located inside the shell, a master pulley sleeving on an master shaft of the motor 52, a belt 53, and a slave pulley 51. In some embodiments, the slave pulley 53 may be connected to the master pulley via the belt 53 in a transmission way. The belt driven system 400 may further include a belt tensioner 54.

In some embodiments, the belt tensioner 54 may include a tension pulley and a position adjusting device. The tension pulley may be configured to tension the belt. The position adjusting device may be configured to automatically adjust a position of the tension pulley based on an interaction of the tension pulley and the belt.

The belt tensioner 54 may include a connecting plate 541, a tension pulley 542, and a spring 543. The connecting plate 541 may be pivotally mounted on a shell of the belt driven system 400. The tension pulley 542 may be connected to the connecting plate 541. The spring 543 may include a first end fixed on the shell and a second end fixed on the connecting plate 541. In some embodiments, a surface of the tension pulley 542 may always press against a belt 53 under an elastic force generated by the spring 543. In some embodiments, the belt 53 may suffer a maximum tension force when the connecting plate 541 pivots to be substantially perpendicular to the belt 53.

As illustrated in FIGS. 4A-4D, the position adjusting device may include the connecting plate 541 and the spring 543.

In the belt driven system 400 including the belt tensioner 54, when an assembler assembles the belt 53, the belt 53 may only need to be assembled to reach a pre-tensioned state. In some embodiments, a satisfied tension force may be achieved by adjusting a path of the spring 543 and/or the number of effective spirals of the spring 543. In some embodiments, one or more belts may reach a same tension state by selecting appropriate paths and the number of effective spirals of one or more springs, so that a deviation of the tensioned state caused by an artificial control of the tension force may be avoided, and the difficulty for controlling the tension force when assembling the belt 53 may be lowered down. If the belt 53 is in a slack state after operating for a period of time, the connecting plate 541 may rotate around a rotation center thereof under the elastic force of the spring 543 and may drive the tension pulley 542 to rotate therewith. In some embodiments, the surface of the tension pulley 542 may always press against the belt 53, so that the surface area of the belt 53 in contact with the tension pulley 542 may increase, and the belt 53 may be tensioned. Compared with the tensioner provided in the prior art, the tension force of the tensioner 54 may be adjusted without removing most of the structural members in the belt driven system 400. In some embodiments, the belt 53 may be in a maximum tensioned state when the connecting plate 541 rotates to be substantially perpendicular to the belt 53. Correspondingly, the surface area of the belt 53 in contact with the tension pulley 542 may be maximum. Mechanical limiting may be performed on the tensioner 54 through the cooperation of the connecting plate 541 and the shell, so that the tensioned state of the belt 53 may be prolonged, and the maintenance cycle may be prolonged. Therefore, the difficulty for maintaining the belt 53 when the belt 53 is in a slack state after a long time of operation may be lowered down.

Since the belt tensioner 54 may adjust the tension force of the belt 53, the difficulty for controlling the tension force when assembling the belt 53 may be lowered down, the difficulty for maintaining the belt 53 when the belt 53 is in a slack state after a long time of operation may be lowered down, the maintenance cycle may be prolonged, and the adjustment of the tensioner 54 during assembling and subsequent maintenance may be facilitated.

In some embodiments, in order to prevent the connecting plate 541 from being released from the shell, the belt tensioner 54 may further include a fixing plate 544, as shown in FIGS. 4C and 4D. The fixing plate 544 may be located on a side of the connecting plate 541 away from the shell and may crimp or press the connecting plate 541 onto the shell.

In the belt tensioner 54 illustrated above, the fixing plate 544 may be provided on the side of the connecting plate 541 away from the shell and may crimp or press the connecting plate 541 onto the shell, so that the connecting plate 541 may be prevented from being released from the shell, and the reliability of the connection of the components in the belt tensioner 54 may be ensured. The shape and/or size of the fixing plate 544 may be determined according to the shape and/or size of the connecting plate 541, the size of the belt tensioner 54, and the internal space of the belt driven system 400.

In some embodiments, in order to achieve a fixed connection between the fixing plate 544 and the shell, the fixing plate 544 may be fixed on the shell by a screw, as shown in FIGS. 4C and 4D.

In some embodiments, the fixing plate 544 and the shell may be fixedly connected by a screw, a retaining screw, or any other suitable fastener that enables the two components to be fixedly connected, for example, a pin, a bolt, a stud, etc. In some embodiments, since the screw connection has the advantages of convenient installation and disassembly, a screw may be used to fix the fixing plate 544 onto the shell in the present disclosure, but the present disclosure is not limited thereto.

In some embodiments, the tension pulley 542 may be fixedly connected to the connecting plate 541 by a screw.

In some embodiments, there may be various manners for fixing the tension pulley 542 and the connecting plate 541, such as welding, riveting, threaded connection, or the like, which are not limited thereto. In some embodiments, since the screw connection has the advantages of easy installation and disassembly, the tension pulley 542 and the connecting plate 541 may be fixed by a screw, a retaining screw, or any other suitable connector, for example, a pin, a bolt, a stud, etc., but the present disclosure is not limited thereto.

In some embodiments, in order to save materials and simplify the installation process, the tension pulley 542 and the connecting plate 541 have an integrated structure.

The tension pulley 542 and the connecting plate 541 may be configured as an integral piece. For example, an arc-shaped boss may be provided on a side of the connecting plate 541 close to the belt 53 as the tension pulley 542. The surface of the arc-shaped boss may always presses against the belt 53 for achieving the tension effect of the tension pulley 542.

In some embodiments, the connecting plate 541 may include a positioning hole. In some embodiments, the shell may include a positioning post. In some embodiments, the connecting plate 541 may be pivotally connected to the positioning post via the positioning hole.

In some embodiments, there may be various forms for fitting the positioning hole pivotable about the positioning post. For example, the positioning post may be a stepped shaft, and the positioning hole may be in clearance fit with the stepped shaft and may directly sleeve on the stepped shaft. In some embodiments, a screw may be used. For example, the screw may pass through the positioning hole and may be pre-locked with the positioning post. In some embodiments, a pin may be used instead of the screw. In some embodiments, any other suitable connection manner may be applied according to a specific situation of the belt tensioner 54.

In some embodiments, an end of the spring 543 may be fixed on the shell via a screw.

In some embodiments, there may be various manners for fixing the fixed end of the spring 543 on the shell. In some embodiments, since the screw connection has the advantages of convenient installation and disassembly, the fixed end of the spring 543 and the shell may be fixedly connected by a screw, or any other suitable connector that enables the two components to be fixedly connected, for example, a pin, a bolt, a stud, etc., but the present disclosure is not limited thereto. In some embodiments, another fixing manner (e.g., welding, riveting, etc.) that may satisfy the connection strength between the fixed end of the spring 543 and the shell may be applied, which are not limited herein.

In some embodiments, the spring 543 may include a first end fixed on the shell and a second end fixed on the connecting plate 541. In some embodiments, the first end of the spring 543 may be fixed on the shell via a screw, as illustrated above.

In some embodiments, as shown in FIGS. 4C and 4D, the connecting plate 541 may include a connecting platform. The connecting platform may be located on a side surface of the connecting plate 541 away from the shell. In some embodiments, the second end of the spring 543 may be hooked on the connecting platform.

In some embodiments, there may be various forms of fixed connections between a telescopic end (i.e., the second end) of the spring 543 and the connecting plate 541. For example, the second end of the spring 543 may be fixedly connected to the connecting plate 541 via a connecting platform on a side surface of the connecting plate 541 away from the shell, and the second end of the spring 543 may be hooked onto the connecting platform. As another example, the second end of the spring 543 may be fixedly connected to the connecting plate 541 via a mounting hole provided on a side surface of the connecting plate 541 away from the shell. In some embodiments, the second end of the spring 543 may directly pass through the mounting hole to achieve a fixed connection. Correspondingly, the installation may be simplified and facilitated, and the production efficiency may be improved.

In the belt driven system 400, the belt 53 may sleeve on the master pulley locating on the master shaft of the motor 52, and the belt 53 may be fixed between the slave pulley 51 and the motor 52 to reach a pre-tensioned state. The tension force of the belt 53 may be adjusted by the belt tensioner 54. The surface of the tension pulley 542 may always press against the belt 53, so that the belt 53 may be tensioned. Using the belt tensioner 54, the difficulty for controlling the tension force when assembling the belt 53 may be lowered down, the difficulty for maintaining the belt 53 when the belt 53 is in a slack state after a long time of operation may be lowered down, and the maintenance cycle may be prolonged. The belt driven system 400 can effectively improve the transmission ability of the belt 53 after a long time of operation, thereby improving the reliability of the transmission.

FIGS. 5A-5D illustrate an exemplary belt driven system 500 with a belt tensioner according to some embodiments of the present disclosure. The belt tensioner may include a fixing bracket 610 mounted on a fixed surface, a tension pulley bracket 620 rotatably connected to the fixing bracket 610 via a rotating structure, and a tension pulley 630 provided on a side of the tension pulley bracket 620 away from the fixing bracket 610 and an elastic member 640. The tension pulley 630 may drive the tension pulley bracket 620 to rotate when the tension pulley 630 suffers a thrust from a belt. The elastic member 640 is located at a position such that the elastic member 640 may deform elastically under a pressure applied by the tension pulley bracket 620 when the tension pulley 630 suffers the thrust from the belt.

In some embodiments, the belt tensioner may include a fixing bracket 610, a tension pulley bracket 620, a tension pulley 630, and an elastic member 640. The fixing bracket 610 may be fixed on an external fixed surface. The fixing bracket 610 may be rotatably connected to the tension pulley bracket 620 via a rotating structure. The tension pulley 630 may be provided on a side of the tension pulley bracket 620 away from the fixing bracket 610. The tension pulley 630 may drive the tension pulley bracket 610 to rotate when the tension pulley 630 suffers a thrust from the belt. The elastic member 640 may be located at a position such that the elastic member 640 may deform elastically under a pressure applied by the tension pulley bracket 610 when the tension pulley 630 suffers the thrust from the belt. In this way, when the tension pulley 630 suffers the thrust from the belt, the tension pulley 630 may drive the tension pulley bracket 610 to rotate, and the elastic member 640 may elastically deform when being pressed by the tension pulley bracket 610 and may bounce the tension pulley 630 until the force suffered by the tension pulley bracket 610 and the force suffered by the tension pulley 630 are balanced, so that the tension pulley 630 may play a role of tensioning the belt. When the belt becomes loose, that is, when the thrust applied to the tension pulley 630 by the belt becomes smaller, the elastic deformation of the elastic member 640 may recover partially to bounce the tension pulley 630, that is, the tension pulley 630 may move away from the fixing bracket 610. The belt may be subjected to the thrust so that the belt may be tensioned in real time. In some embodiments, the belt tensioner may automatically perform the tensioning of the belt in real time and may not require external personnel to perform manual operation, and thus, the manual operation for the adjustment of the belt tensioner may be avoided, and the cumbersome operation in the prior art may be avoided.

Figure 5A:
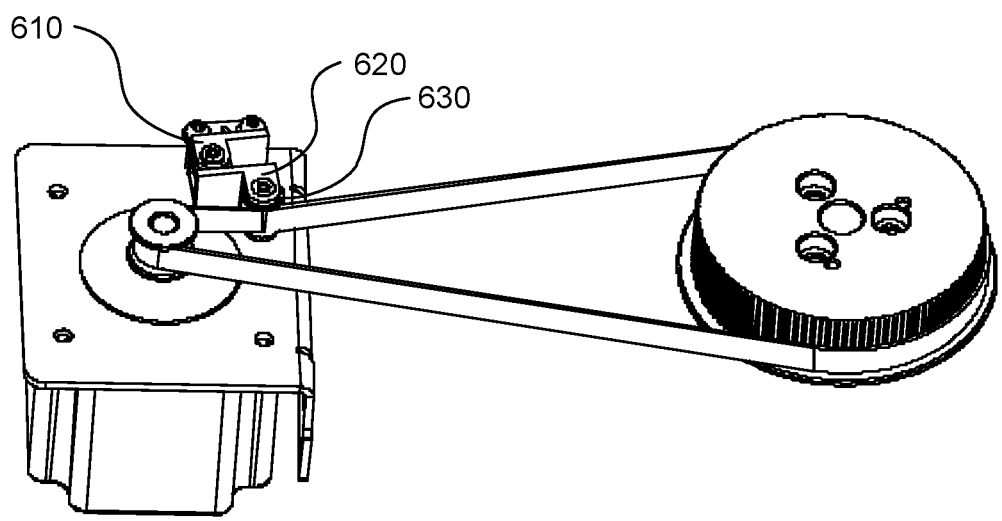
FIGS. 5A-5D illustrate an exemplary belt driven system with a belt tensioner according to some embodiments of the present disclosure.
Figure 5B:
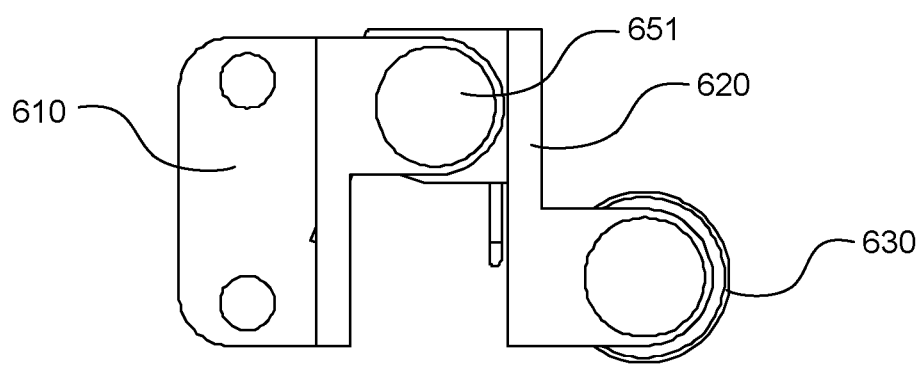
Figure 5C:
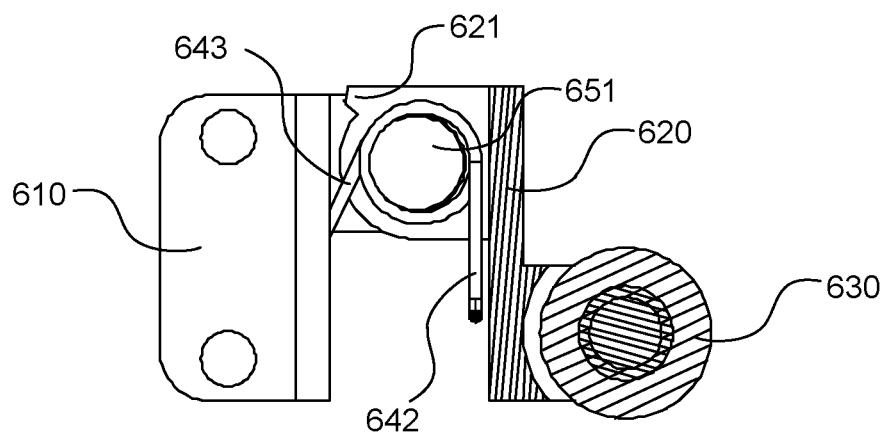
Figure 5D:
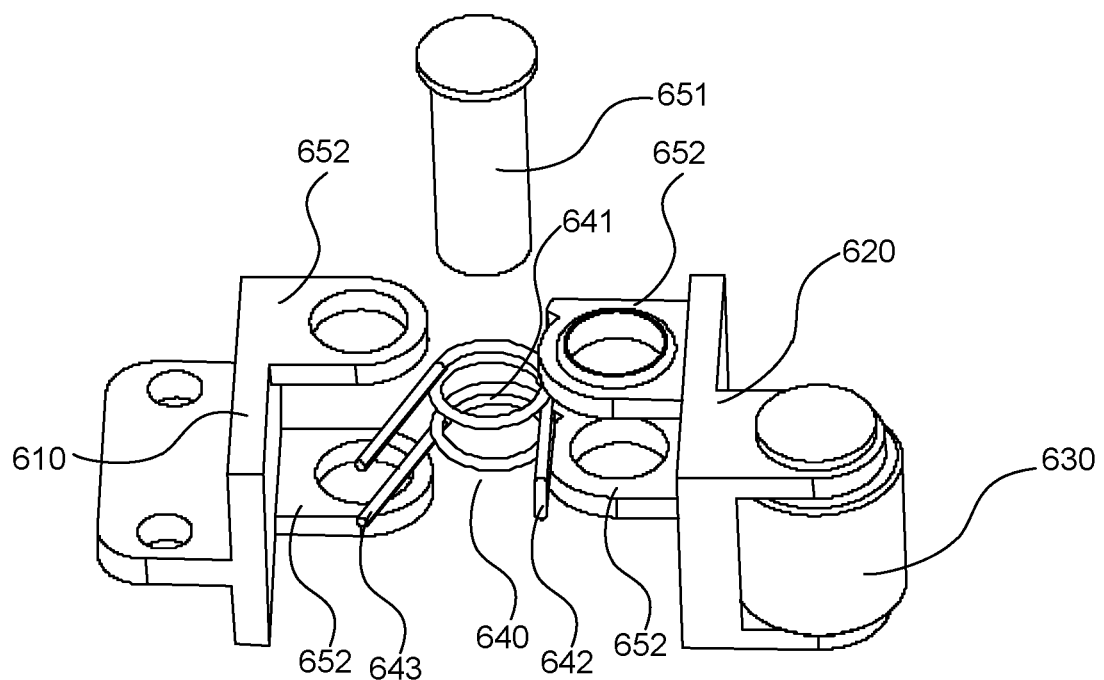

As shown in FIGS. 5B to 5D, the elastic member 640 may include a body having a shaft hole 641 of the elastic member 640. The body may be configured to sleeve on a rotating shaft 651 of the rotating structure via the shaft hole 641 of the elastic member 640. The elastic member 640 may further include an elastic arm 642 and a fixed arm 643 located on a surface of the body. The fixed arm 643 may be fixed relative to the fixing bracket 610. The elastic arm 642 and the tension pulley bracket 620 may be located on a same side of the body. The elastic arm 642 may be located at a position such that the elastic arm 642 may deform elastically under a pressure applied by the tension pulley bracket 620 when the tension pulley 630 suffers the thrust from the belt.

Since the fixed arm 643 is fixed relative to the fixing bracket 610, and the elastic arm 642 and the tension pulley bracket 620 are located on the same side, when the tension pulley 630 suffers the thrust applied by the belt, the elastic arm 642 may be pressed by the tension pulley bracket 620 and may elastically deform to bounce the tension pulley 630 until the force received by the tension pulley bracket 620 and the force received by the tension pulley 630 are balanced, so that the tension pulley 630 plays a role of tensioning the belt. When the belt becomes loose, that is, when the thrust applied to the tension pulley 630 by the belt becomes smaller, the elastic deformation of the elastic member 640 may recover partially to bounce the tension pulley 630, that is, the tension pulley 630 may move away from the fixing bracket 610, the belt may be subjected to the thrust, and the belt may be tensioned in real time.

In some embodiments, the elastic member 640 may be a double torsion spring as shown in FIG. 5D. The double torsion spring may include a first torsion arm and a second torsion arm. In some embodiments, the two torsion arms of the double torsion spring may face the same side, that is, a parallel double torsion spring may be used. A spring wire of the double torsion spring may spiral to define the shaft hole 641 of the elastic member 640. One torsion arm of the double torsion spring may be used as the fixed arm 643 and may press against the fixing bracket 610. The other torsion arm of the double torsion spring may be used as the elastic arm 642.

In some embodiments, the installation of the belt tensioner may be facilitated by using the double torsion spring with two torsion arms facing the same side. It may be convenient for the double torsion spring to sleeve on the rotating shaft 651 of the rotating structure through the shaft hole 641 of the elastic member 640 spirally defined by the spring wire. One torsion arm may be used as the fixed arm 643 and may press against the fixing bracket 610. The other torsion arm may be used as the elastic arm 642. Therefore, when the belt becomes loose, the thrust applied to the tension pulley 630 by the belt may become smaller, the elastic deformation of the torsion arm used as the elastic arm 642 may recover partially to bounce the tension pulley 630, that is, the tensioner may move away from the fixing bracket 610, the belt may be subjected to the thrust, and the belt may be tensioned in real time.

In some embodiments, the elastic member 640 may be a double torsion spring with two torsion arms facing opposite sides. A spring wire of the double torsion spring may spiral to define the shaft hole 641 of the elastic member 640. One torsion arm of the double torsion spring may be used as the fixed arm 643 and may be fixed to the tension pulley 630. The other torsion arm of the double torsion spring may be used as the elastic arm 642.

Using a double torsion spring with two torsion arms facing opposite sides, the installation of the belt tensioner may be facilitated. It may be convenient for the double torsion spring to sleeve on the rotating shaft 651 of the rotating structure through the shaft hole 641 of the elastic member 640 spirally defined by the spring wire. One torsion arm may be used as the fixed arm 643 and may be fixed to the fixing bracket 610. The other torsion arm may be used as the elastic arm 642. Therefore, when the belt becomes loose, the thrust applied to the tension pulley 630 by the belt may become smaller, and the elastic deformation of the elastic arm 642 may recover partially to bounce the tension pulley 630, that is, the tension pulley 630 may move away from the fixing bracket 610. Then the belt may be subjected to the thrust, and the belt may be tensioned in real time.

In some embodiments, the elastic member 640 may be a single torsion spring. A spring wire of the single torsion spring may spiral to enclose the shaft hole 641 of the elastic member 640. A fixed end of the single torsion spring may be used as the fixed arm 642 and may be fixed to the tension pulley bracket 620. A torsion arm of the single torsion spring may be used as the elastic arm 642.

The single torsion spring has simple structure, making the installation of the belt tensioner being facilitated. It may be convenient for the single torsion spring to sleeve on the rotating shaft 651 of the rotating structure through the shaft hole 641 of the elastic member 640 spirally defined by the spring wire. The fixed end of the single torsion spring may be used as the fixed arm 642 and may be fixed to the tension pulley bracket 620. The torsion arm may be used as the elastic arm 642. Therefore, when the belt becomes loose, the thrust applied to the tension pulley by the belt may become smaller, and the elastic deformation of the elastic arm 642 may recover partially to bounce the tension pulley 630, that is, the tensioner may move away from the fixing bracket 610. Then the belt may be subjected to the thrust, and the belt may be tensioned in real time.

In some embodiments, a first side surface of the fixing bracket 610 may face a second side surface of the tension pulley bracket 620. In some embodiments, the first side surface and the second side surface may be referred to as two facing side surfaces.

As shown in FIGS. 5B to 5D, the rotating connection between the tension pulley bracket 620 and the fixing bracket 610 may be achieved as follows. In some embodiments, each of the two facing side surfaces of the fixing bracket 610 and the tension pulley bracket 620 may be provided with a pair of parallel shaft plates 652. Each shaft plate may have a shaft hole. In some embodiments, the rotating structure may include a rotating shaft 651 and the shaft plates 652. In some embodiments, the shaft holes of the shaft plates 652 may sleeve on the rotating shaft 651. In some embodiments, the elastic member 640 may be located between two inner shaft plates 652. In this way, the rotating connection between the tension pulley bracket 620 and the fixing bracket 610 may be achieved with a simple structure.

In order to make the structure of the belt tensioner more compact, as shown in FIGS. 5B to 5D, two shaft plates 652 on a same side of the elastic member 640 may be provided on the fixing bracket 610 and the tension pulley bracket 620, respectively. In this way, the elastic member 640 makes a full use of the space between the two shaft plates 652 on the inner side, making the structure of the belt tensioner more compact.

In order to set a maximum preset rotation angle of the tension pulley bracket 620 and the tension pulley 630 as a whole relative to the fixing bracket 610, as shown in FIGS. 5B to 5D, the tension pulley bracket 620 may be further provided with a bump 621. When the elastic arm 642 bounces the tension pulley bracket 620, the bump 621 may approach the fixing bracket 610 until the bump 621 presses against the fixing bracket 610, and the elastic arm 642 may bounce the tension pulley bracket 620 to the maximum position.

As illustrated above, the tension pulley bracket 620 and the tension pulley 630 as a whole have the maximum preset rotation angle with respect to the fixing bracket 610. That is to say, the rotation of the tension pulley bracket 620 and the tension pulley 630 as a whole with respect to the fixing bracket 610 is within a certain range. After the position of the belt is determined, the position of the fixing bracket 610 may be adjusted according to the maximum preset angle, so that the elastic member 640 may press against the tension pulley bracket 620 and the bump 621 may not press against the fixing bracket 610, and thereby reserving an rotating angle which is enough for the tension pulley bracket 620 and the tension pulley 630 as a whole for the tension adjustment after the belt is changed.

In some embodiments, a tension shaft may be provided on a side of the tension pulley bracket 620 away from the fixing bracket 610, and the tension pulley 630 may sleeve on the tension shaft. In this way, when the tension pulley 630 presses the belt, the belt may drive the tension pulley 630 to rotate.

In some embodiments, the elastic member 640 may be a compression spring. One end of the compression spring may be fixed to the fixing bracket 610. The other end may face the tension pulley bracket 620. In this way, when the tension pulley 630 suffers the thrust from the belt, the tension pulley 630 may drive the tension pulley bracket 620 to rotate, and the compression spring may be pressed by the tension pulley bracket 620 and may elastically deform to bounce the tension pulley 630 until the force suffered by the tension pulley bracket 620 and the force suffered by the tension pulley 630 are balanced, so that the tension pulley 630 plays a role of tensioning the belt. When the belt becomes loose, the thrust applied to the tension pulley 630 by the belt may become smaller, the elastic deformation of the compression spring may recover partially and bounce the tension pulley 630, and the tension pulley 630 may move away from the fixing bracket 610. Then the belt may be subjected to the thrust, and the belt may be tensioned in real time.

In some embodiments, the fixing bracket 610, the tension pulley bracket 620, and the elastic member 640 may form the position adjusting device 354.

Figure 6A:
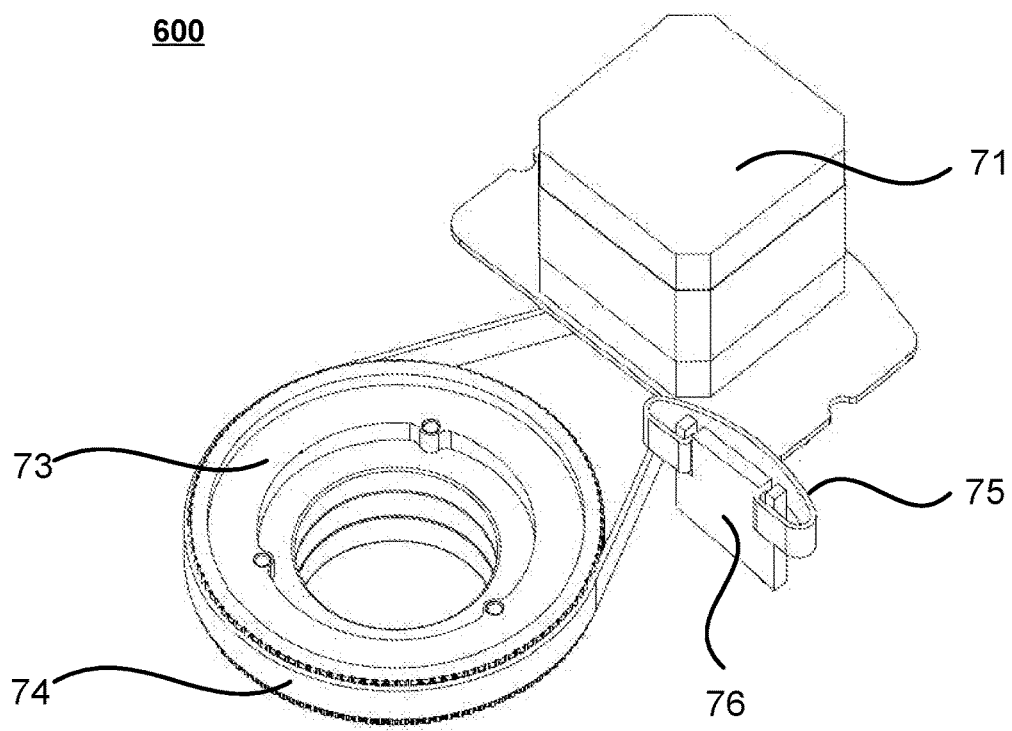
FIGS. 6A-6C illustrate an exemplary belt driven system with a belt tensioner according to some embodiments of the present disclosure.
Figure 6B:
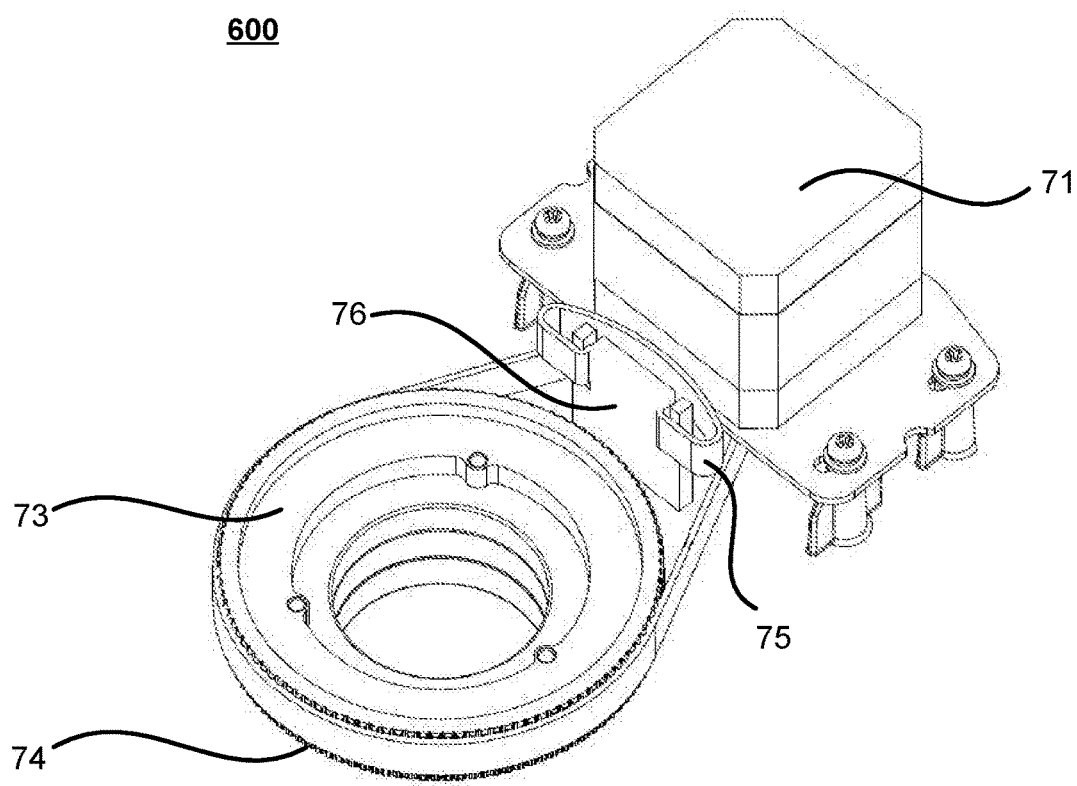
Figure 6C:
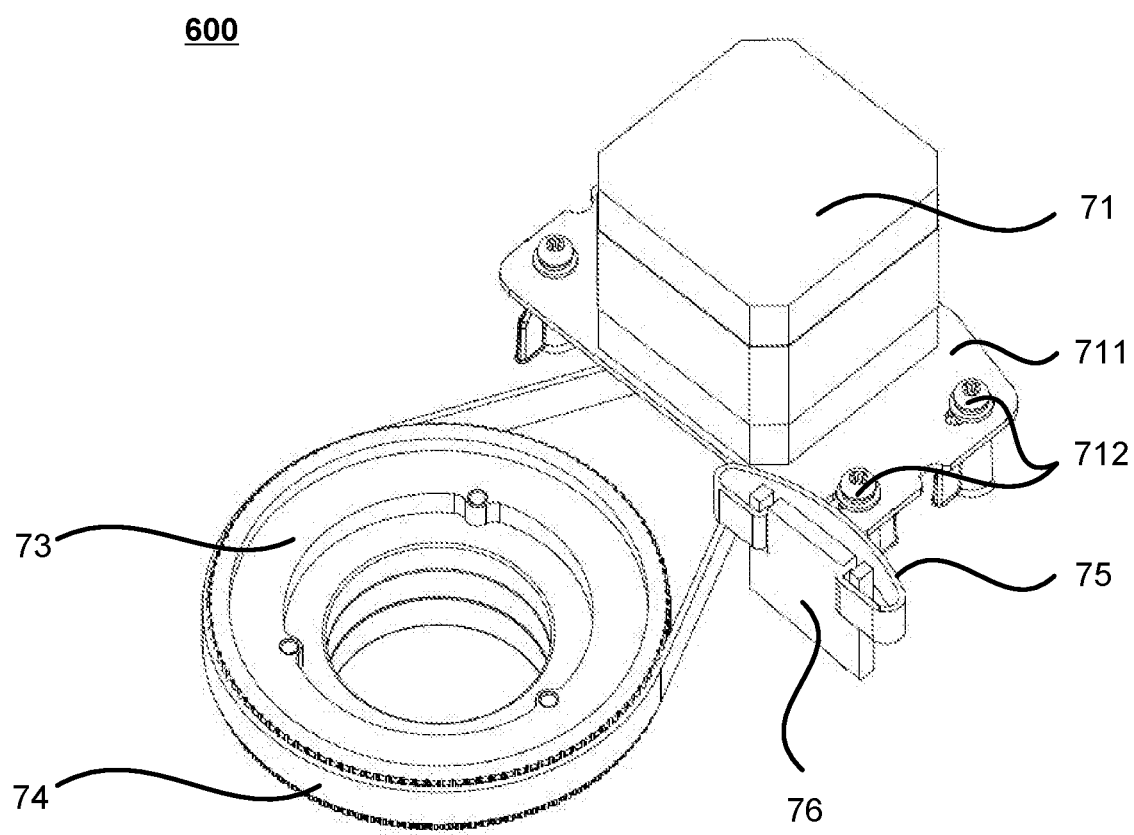

FIGS. 6A-6C illustrate an exemplary belt driven system 600 with a belt tensioner according to some embodiments of the present disclosure. The belt driven system 600 may include a master pulley, a slave pulley 73, a drive belt 74, and a motor 71. The motor 71 may be fixed to the master pulley (not shown in FIGS. 6A-6C) to drive the master pulley to rotate. The drive belt 74 may be provided on an outer periphery of the master pulley and an outer periphery of the slave pulley 73 and may be configured for transmission. The belt tensioner may include a fixing post 76 and an elastic pressure member 75. The elastic pressure member 75 may be fixed on the fixing post 76 and may elastically press against the motor 71 of the belt driven system 600.

In some embodiments, the belt driven system 600 may be mounted on an operating platform. In some embodiments, the fixing post 76 may be provided on the operation platform. In some embodiments, the elastic pressure member 75 may be mounted on the fixing post 76. In some embodiments, the elastic pressure member 75 may press against an outer side surface of the motor 71. The position of the motor 71 may be adjustable. The position of the motor 71 may be adjusted so that the elastic force of the elastic pressure member 75 and a tightening force of the drive belt 74 are balanced, and then the position of the motor 71 may be fixed to ensure an appropriate tension degree of the drive belt 74. In this way, the adjustment process of the tension degree of the drive belt 74 may be simplified, and the running smoothness and the service life of the drive belt 74 may be improved. After a long period of operation and transmission, the drive belt 74 may slack, and accordingly, the drive belt 74 may need to be re-tensioned. In some embodiments, the fixed motor 71 may be dismounted, the position of the motor 71 may be adjusted so that the elastic force of the elastic pressure member 75 and the tightening force of the drive belt 74 are balanced, and then the position of the motor 71 may be fixed to re-ensure an appropriate tension degree of the drive belt 74.

In some embodiments, as shown in FIG. 6A, the elastic pressure member 75 of the belt tensioner may be an elastic pressing reed. In some embodiments, the elastic pressing reed may be arc-shaped, and both ends thereof may be fixedly connected to the fixing post 76. In some embodiments, a middle portion of the arc-shaped elastic pressing reed may press against an outer side surface of the motor 71. In some embodiments, the arc-shaped elastic pressing reed may be a metal reed. The metal reed may have good restoring property, high strength, and long service life. In some embodiments, the arc-shaped elastic pressing reed may be shaped like a Chinese character as shown in FIG. 6A. It should be noted that the shape of the elastic pressing reed shown in FIG. 6A is merely provided for the purposes of illustration, and not intended to limit the scope of the present disclosure. In some embodiments, the elastic pressing reed may be shaped like a Chinese character "A".

In some embodiments, the elastic pressure member 75 may be made of one or more materials including, for example, a thermoset rubber, a thermoplastic elastomer, etc. A thermoset rubber may include, for example, a natural rubber (NR), a polyisoprene rubber (IR), a polychloroprene rubber (CR), a styrene butadiene rubber (SBR), a nitrile butadiene rubber (NBR), an ethylene propylene diene monomer rubber (EPDM), a polybutadiene rubber (BR), an epichlorohydrin rubber (ECO), a fluorinated hydrocarbon-butyl rubber (FKM), a silicone rubber, etc. A thermoplastic elastomer may include a styrenic block copolymer (TPS), a thermoplastic polyolefinelastomer (TPO), a thermoplastic vulcanizate (TPV), a thermoplastic polyurethane (TPU), a hermoplastic copolyester (TPC), a thermoplastic polyamide (TPA), a not classified thermoplastic elastomer (TPZ), etc. In some embodiments, the pressing member made of an elastic material (e.g., a thermoset rubber, a thermoplastic elastomer) may be easily shaped, easy to use, suitable for short-term and high frequency transmissions, and may be replaced easily. In some embodiments, the elastic pressure member 75 may have one or more shapes including, for example, arc shape, U shape, V shape, S shape, Z shape, X shape, M shape, C shape, etc. In some embodiments, the elastic pressure member may be an elastic rubber member.

In some embodiments, the elastic pressure member 75 of the belt tensioner may include one or more pressing springs. In some embodiments, one or more pressing springs may form a spring set. The pressing spring(s) may be positioned and/or connected side by side. In some embodiments, one end of the spring set may be fixed on the fixing post 76, while the other end of the spring set may press against the motor 71, so that an elastic thrust may be generated when the motor 71 is moved.

In some embodiments, as shown in FIG. 6B, the elastic pressure member 75 of the belt tensioner may be mounted on a central line of the master pulley and the slave pulley 73, so that the belt driven system 600 may be more balanced when the tension degree of the drive belt is adjusted, and the motor 71 is less likely to swing.

As shown in FIGS. 6B and 6C, the motor 71 may be a flange motor. The flange motor may include a flange cover located on a shell of the motor 71. The flange cover may be configured to support a rotor of the motor 71, place a bearing, and/or provide a protection for the motor 71 by sealing the motor 71. The flange motor has the characteristics of low noise, small size, high efficiency, energy saving, and good operation performance, or the like. The flange motor may be easily installed in practical use.

In some embodiments, as shown in FIG. 6C, one or more bolt holes 712 may be provided on a flange 711 of the flange motor 71. In some embodiments, the bolt holes 712 may be symmetrically distributed. In some embodiments, the bolt holes 712 may be configured to fix the flange motor 71, thereby ensuring low noise, high efficiency, energy saving, and stable operation during the operation of the motor 71. In some embodiments, the bolt holes 712 may include at least one circular bolt hole and at least one waist-shaped bolt hole. In some embodiments, the bolt hole(s) 712 on one side of the motor 71 may be circular, while the bolt hole(s) 712 on the other side may be waist-shaped. In this way, the tension adjustment process of the drive belt 74 may be simplified. For example, to adjust the tension degree of the drive belt 74, the bolt hole(s) 712 may be loosened, the bolt(s) on one side of the waist-shaped bolt holes 712 may slide in a waist-shaped bolt hole groove, and all the bolts may be simply tightened once the elastic force of the elastic pressure member 75 and the tightening force of the drive belt 74 are balanced, and then the tensioning adjustment of the drive belt 74 may be completed.

In some embodiments, the drive belt 74 may include a leather drive belt or a drive chain. The leather drive belt and/or the drive chain may have various types. In some embodiments, the leather drive belt may include a V-shaped section, a trapezoidal section. In some embodiments, the leather drive belt may include one or more latches. It should be noted that the above description of the drive belt 74 is merely provided for the purposes of illustration, and not intended to limit the scope of the present disclosure.

Figure 7A:
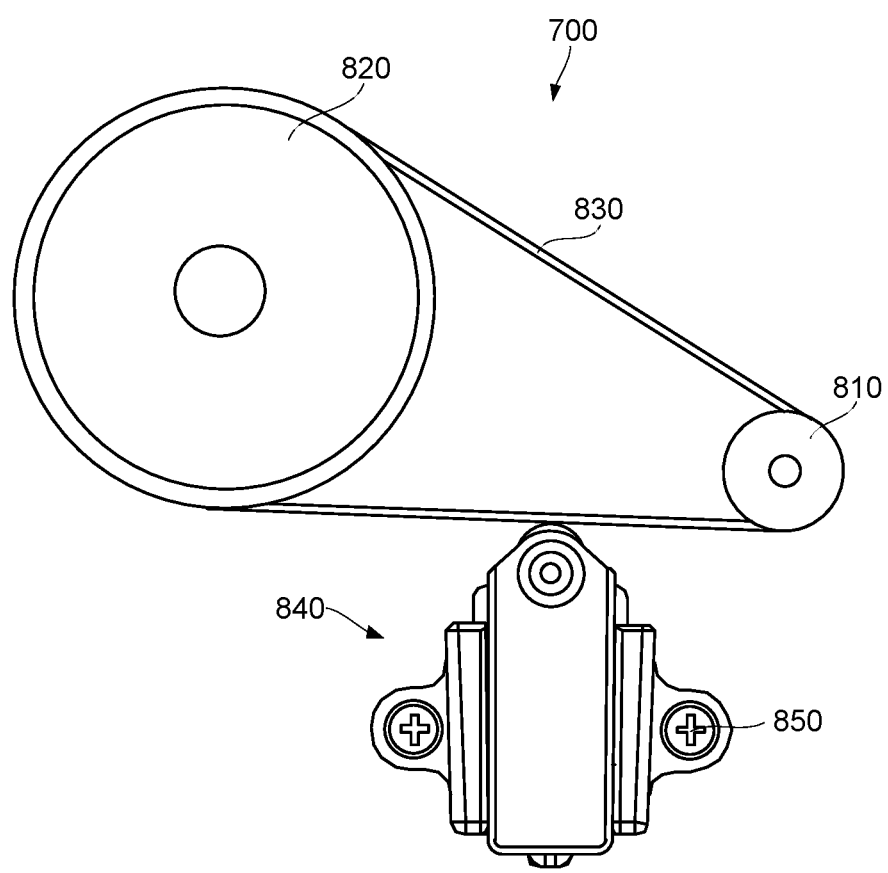
FIGS. 7A-7E illustrate an exemplary belt driven system with a belt tensioner according to some embodiments of the present disclosure.
Figure 7B:
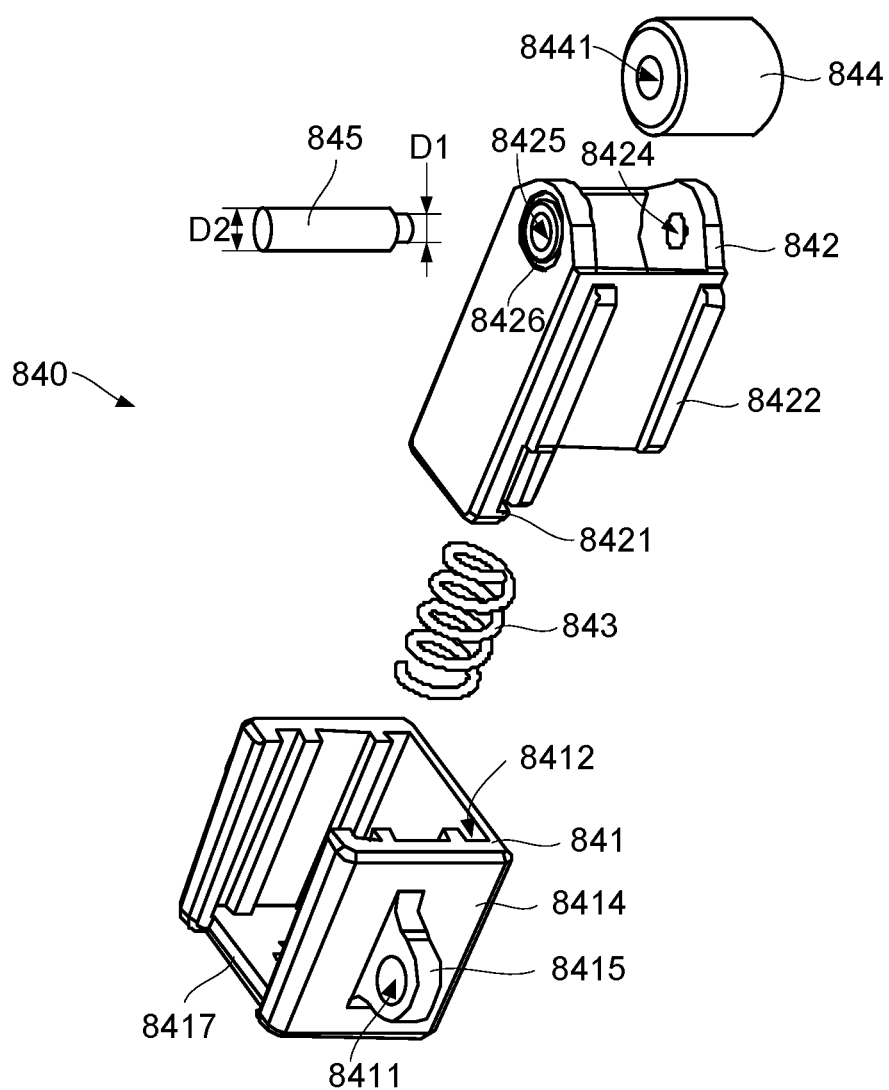
Figure 7C:
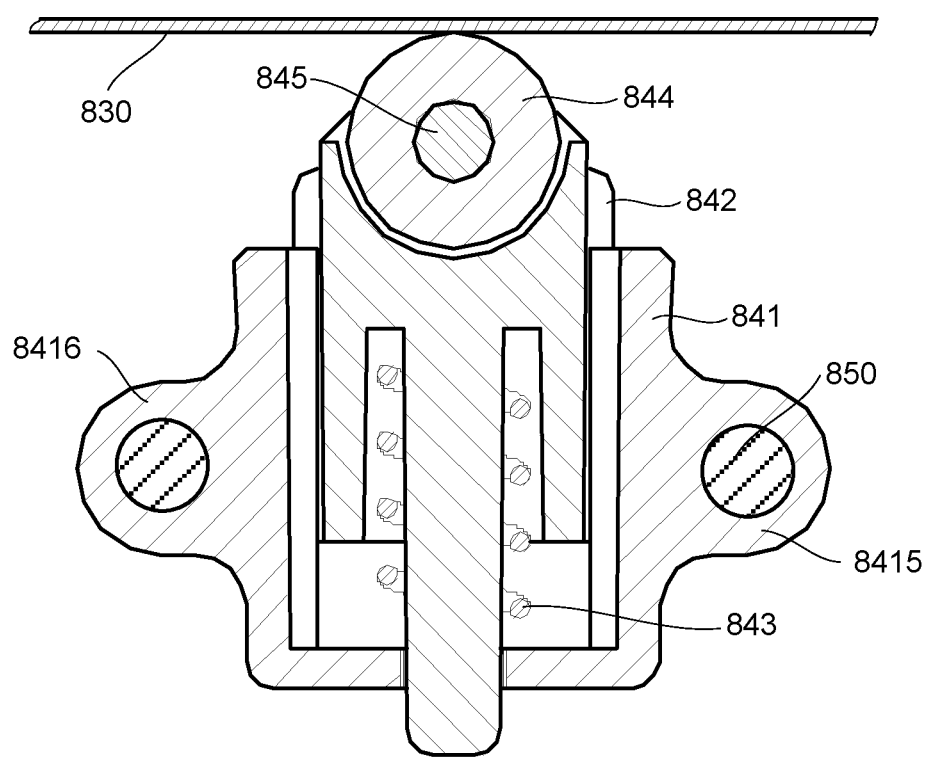

FIGS. 7A-7E illustrate an exemplary belt driven system 700 with a belt tensioner according to some embodiments of the present disclosure. The belt tensioner 840 may include a fixed base 841, a slidable base 842, an elastic member 843, and a tension roller 844. In some embodiments, the fixed base 841 may include at least one fixing hole 8411. As shown in FIGS. 7B and 7C, the fixed base 841 may include a fixing hole 8411 on each of a first side surface 8414 and a second side surface (not shown). In some embodiments, the first side surface 8414 and the second side surface are symmetrical. A fixing hole 8411 may be located in a first ear plate 8415 on the first side surface 8414, and another fixing hole 8411 may be located in a second ear plate 8416 on the second side surface opposite to the first side surface 8414. The number of the fixing holes 8411 provided on the fixed base 841 may be an integer, such as one, two, three, or the like. The position and the number of the fixing holes 8411 may be determined according to actual needs. The fixing holes 8411 provided on the fixed base 841 may be configured for fixing and installing the fixed base 841 to a device that coordinates with the belt driven system 700. For example, the fixed base 841 may be fixed to the device with a fastener such as a screw 850, a bolt, or the like.

In some embodiments, the slidable base 842 may be slidably mounted on the fixed base 841. The slidable base 842 may slide with respect to the fixed base 841 so as to adjust an overall size of the tensioner 840, and thus achieving the adjustment of the tension force of the belt 830.

In some embodiments, the elastic member 843 may be located between the fixed base 841 and the slidable base 842, so that the slidable base 842 may slide away from the fixed base 841 along an extending direction of the fixed base 841. As shown in FIG. 7B, the elastic member 843 located between the fixed base 841 and the slidable base 842 may be a compression spring or any other element with elasticity, such as a rubber spring, a leaf spring, or the like. Under the action of the elastic force of the elastic member 843, the slidable base 842 may slide away from the fixed base 841 along the extending direction of the fixed base 841.

Figure 7D:
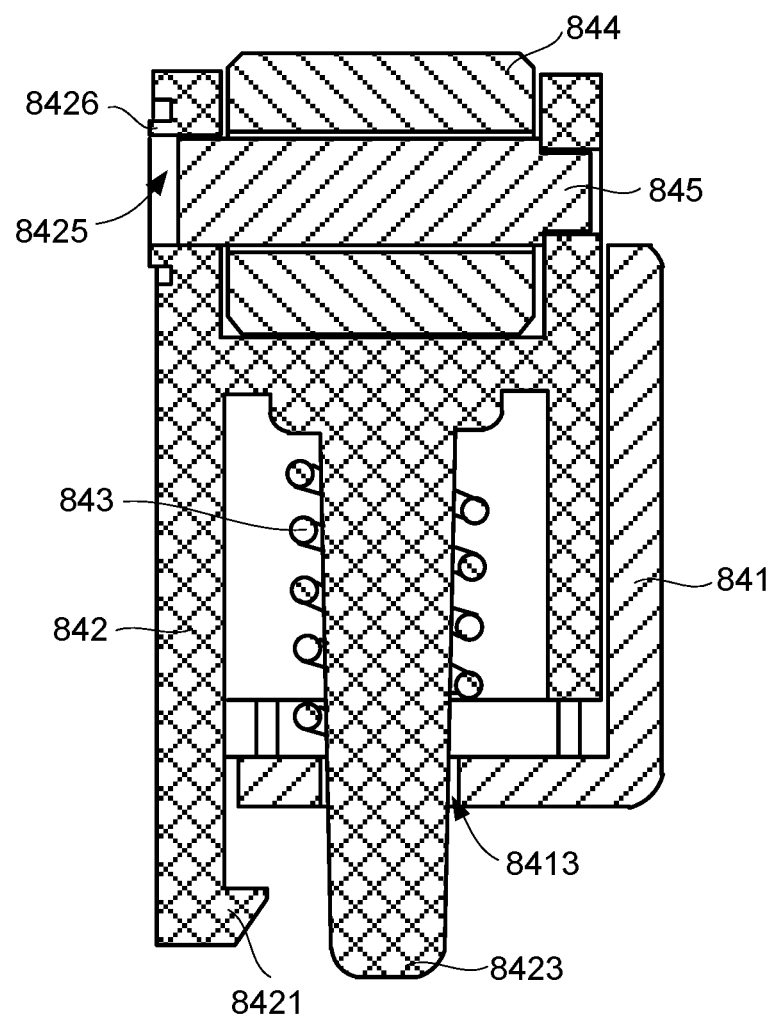
Figure 7E:
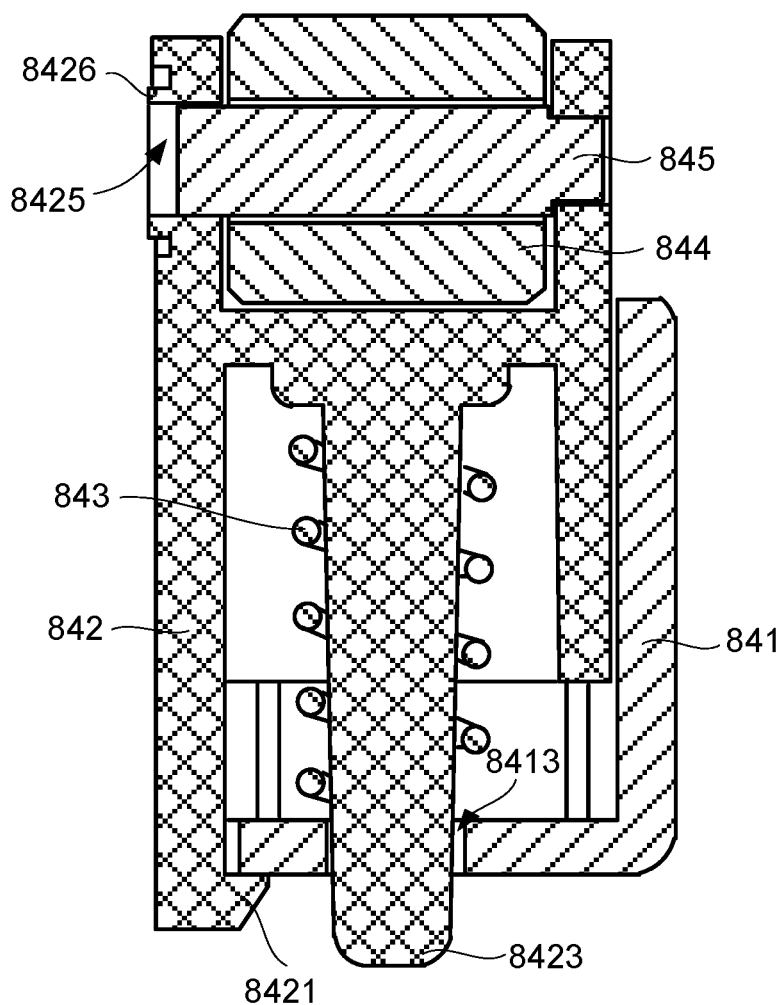

In some embodiments, the tension roller 844 may be rotatably mounted on an end of the slidable base 842 away from the fixed base 841, and the tension roller 844 may rotate around an axis thereof. As shown in FIGS. 7B, 7D and 7E, the tension roller 844 may include an axial through-hole 8441, and may be installed to an end of the slidable base 842 by a rotating shaft 845 passing through the axial through-hole 8441. The rotating shaft 845 and the axial through-hole 8441 may be in clearance fit, so that the tension roller 844 can rotate around the rotating shaft 845. The rotating shaft 845 may be in interference fit with a first through-hole 8424 and a second through-hole 8425 of the slidable base 842, so that the rotating shaft 845 may be fixed to the slidable base 842.

In some embodiments, the tensioner 840 may be used in a belt driven system 700. As shown in FIG. 7A, the belt driven system 700 may include a master pulley 810, a slave pulley 820, a belt 830, and a tensioner 840 for providing tension force for the belt 830. In some embodiments, the fixed base 841 may be installed to the device by a fastener such as a screw 850. The slidable base 842 may be slidably installed to the fixed base 841, so that the slidable base 842 may slide along the extending direction of the fixed base 841. In some embodiments, the elastic member 843 may be located between the fixed base 841 and the slidable base 842. The elastic member 843 may enable the slidable base 842 to slide away from the fixed base 841. In some embodiments, the tension roller 844 may be installed to an end of the slidable base 842 away from the fixed base 841. An outer periphery of the tension roller 844 may press against the belt 830 in the belt driven system 700. The tension roller 844 may rotate around an axis thereof with the movement of the belt 830 so as to enable the belt 830 to maintain appropriate tension force. If the tension force of the belt 830 becomes smaller for various reasons, the slidable base 842 may slide towards the belt 830 along the extending direction of the fixed base 841 under the action of the elastic force of the elastic member 843, and thus driving the tension roller 844 to move towards the belt 830. Therefore, the tension roller 844 may press the belt 830 while rotating, so that the belt 830 may maintain appropriate tension force all the time, and the belt driven system 700 may be in a normal operation state all the time.

As illustrated above, the tensioner 840 may include the fixed base 841, the slidable base 842, the elastic member 843, and the tension roller 844, and the assembly of the fixed base 841, the slidable base 842, the elastic member 843, and the tension roller 844 may be simple. The belt driven system 700 may operate when the fixed base 841 is installed thereto. In some embodiments, the fixed base 841 may be fixed without using one or more screws 850, and accordingly, the installation of the tensioner 840 may be simple and convenient. Therefore, the tensioner 840 has the characteristics of simple and convenient in installation.

In some embodiments, as shown in FIGS. 7B, 7D, and 7E, the slidable base 842 may include a limiting structure at an end of the slidable base 842 facing the fixed base 841. The limiting structure may be configured to prevent the slidable base 842 from being separated from the fixed base 841 when sliding. In some embodiments, the limiting structure may be a limiting bump 8421 located at an end of the slidable base 842, as shown in FIG. 7D. In some embodiments, the limiting structure may be a groove located on a side surface of the slidable base 842 facing the fixed base 841. Accordingly, a limiting bump that can slide into the groove may be provided on the fixed base 841. The position of the limiting structure is not limited to the slidable base 842. In some embodiments, the limiting structure may be located on the fixed base 841 to prevent the separation of the slidable base 842 from the fixed base 841.

Since the limiting structure may be provided at an end of the slidable base 842, the slidable base 842 can be prevented from being separated from the fixed base 841 by the limiting structure, and the tensioner 840 can maintain a normal operation state, and thus improving the reliability of the belt driven system 700.

As shown in FIGS. 7B, 7D, and 7E, the limiting structure may be the limiting bump 8421 protruding from a surface of the slidable base 842. The limiting bump 8421 may extend along a direction perpendicular to the extending direction of the fixed base 841. In some embodiments, the limiting structure may be the limiting bump 8421 protruding from a surface of the slidable base 842. In some embodiments, the limiting structure may be a limiting baffle protruding from a surface of the slidable base 842.

As shown in FIG. 7B, when the slidable base 842 slides along the fixed base 841 towards the belt 830, the limiting bump 8421 provided on the surface of the slidable base 842 can be blocked by a bottom surface 8417 of the fixed base 841. Accordingly, the tensioner 840 may enable the belt 830 to have a maximum tension force, and meanwhile providing an alert to remind an operator to change the tensioner 840. When the limiting bump 8421 presses against the bottom surface 8417 of the fixed base 841, the fixed base 841 may prevent the slidable base 842 from continuing sliding towards the belt 830. In the assembly of the tensioner 840, the limiting bump 8421 can prevent the slidable base 842 from being separated from the fixed base 841 so as to guarantee the integrity of the tensioner 840. When installing the tensioner 840 to a desired position, the operator only needs to install the fixed base 841 to the device to complete the installation, which makes the installation of the tensioner 840 simple and convenient.

In order to improve the sliding stability of the slidable base 842 along the fixed base 841, as shown in FIGS. 7B and 7C, at least one side surface of the fixed base 841 facing the slidable base 842 may be provided with a sliding groove 8412 or a sliding rail along the extending direction of the fixed base 841. The slidable base 842 may be provided with a guide bump 8422 or a guide groove corresponding to the sliding groove 8412 or the sliding rail As shown in FIGS. 7B and 7C, the fixed base 841 may be provided with two sliding grooves 8412 on each of the two side surfaces facing the slidable base 842. Each sliding groove 8412 may have a same extending direction as that of the fixed base 841. If the slidable base 842 is installed inside the fixed base 841, the guide bump 8422 may be slidably fitted in the corresponding sliding groove 8412, and the slidable base 842 may slide along the extending direction of the fixed base 841 through the sliding coordination of the guide bump 8422 and the sliding groove 8412.

The installation and fitting structure of the slidable base 842 and the fixed base 841 is not limited to the structure as shown in FIG. 7B in which the slidable base 842 is slidably installed inside the fixed base 841. In some embodiments, the slidable base 842 may be slidably sheathed outside the fixed base 841. In some embodiments, the fixed base 841 may include a positioning post extending towards the slidable base 842. Accordingly, the slidable base 842 may include a positioning groove or a positioning hole on a side wall of the slidable base 842, which may allow the positioning post fit thereto and slide therein, so that the slidable base 842 can slide along the extending direction of the fixed base 841.

As shown in FIG. 7B, the sliding groove 8412 may have a rectangle cross section. In some embodiments, the cross section of the sliding groove 8412 and the guide bump 8422 may be in any shape such as a rectangle shape, a trapezoid shape, a hem icycle shape, a square shape, a triangle shape, a polygon shape, or the like.

In order to improve the operation stability of the elastic member 843 and the slidable base 842, as shown in FIGS. 7C, 7D, and 7E, the slidable base 842 may be provided with a guide post 8423 extending towards the fixed base 841 on a side surface of the slidable base 842 facing the fixed base 841. The fixed base 841 may include a guide hole 8413 corresponding to the guide post 8423. In some embodiments, the guide post 8423 can protrude through the fixed base 841 to an outside of the fixed base 841 when passing through the guide hole 8413. In some embodiments, the elastic member 843 may sleeve on the guide post 8423.

Since the elastic member 843 sleeves on the guide post 8423, in the assembly of the tensioner 840, the elastic member 843 may only need to sleeve on the guide post 8423 to complete the installation of the elastic member 843. Since the elastic member 843 may be installed between the fixed base 841 and the slidable base 842, the elastic member 843 can maintain a normal operation state all the time, and the elastic member 843 can be prevented from being damaged.

In some embodiments, the guide post 8423 can guarantee that the slidable base 842 slides along the extending direction of the fixed base 841 all the time while facilitating the assembly of the elastic member 843. Therefore, the normal use and operation stability of the tensioner 840 may be guaranteed. In some embodiments, the guide post 8423 may be configured as a cylindrical structure with an axial cavity, so that the elastic member 843 may be installed into the axial cavity of the cylindrical structure.

In some embodiments, one end of the elastic member 843 may be detachably connected to the fixed base 841 and the other end of the elastic member 843 may be detachably connected to the slidable base 842. The fixed base 841 and the slidable base 842 may be connected by the elastic member 843 so as to prevent the slidable base 842 from being separated from the fixed base 841.

In order to improve the connection strength and stability of the tension device 840 to the device, as shown in FIGS. 7A and 7C, the fixed base 841 may be provided with two fixing holes 8411. In some embodiments, a first side surface 8414 of the fixed base 841 may include a first ear plate 8415. In some embodiments, a second side surface of the fixed base 841 opposite to the first side surface 8414 may include a second ear plate 8416. In some embodiments, the first ear plate 8415 may include a fixing hole 8411 extending throughout the thickness of the first ear plate 8415. The second ear plate 8416 may include another fixing hole 8411 extending throughout the thickness of the second ear plate 8416.

In some embodiments, the fixed base 841 may include two fixing holes 8411, which is merely a specific form of the fixed base 841. In some embodiments, the fixed base 841 may include only one fixing hole 8411. For example, the one fixing hole 8411 may be located in the bottom surface 8417 of the fixed base 841. In some embodiments, the fixed base 841 may include a plurality of fixing holes 8411. It should be noted that the above description of the number of the fixing holes 8411 is merely provided for the purpose of illustration, and not intended to limit the scope of the present disclosure.

In some embodiments, as shown in FIGS. 7A, 7D, and 7E, the tension roller 844 may be installed on the slidable base 842 by the rotating shaft 845. In some embodiments, the rotating shaft 845 and the tension roller 844 may be in clearance fit. Using the rotating shaft 845, the difficulty of the installation of the tension roller 844 on the slidable base 842 may be reduced. The clearance fit between the rotating shaft 845 and the tension roller 844 can guarantee that the tension roller 844 may rotate freely when frictionally contacting with the belt 830. Accordingly, a rolling friction may be generated between the tension roller 844 and the belt 830, and thus the power consumption of the belt driven system 700 may be reduced, and the transmission efficiency of the belt driven system 700 may be improved.

In order to facilitate the installation of the rotating shaft 845 and improve the firmness of the rotating shaft 845, as shown in FIGS. 7D and 7E, the rotating shaft 845 may be configured as a stepped shaft with a first portion having a first diameter D1 and a second portion having a second diameter D2. In some embodiments, the slidable base 842 may include a first through-hole 8424 and a second through-hole 8425 configured for installing the stepped shaft. A diameter of the first through-hole 8424 may be equal to the first diameter D1. A diameter of the second through-hole 8425 may be equal to the second diameter D2. In some embodiments, the first through-hole 8424 and/or the second through-hole 8425 may be in interference fit with the stepped shaft.

In some embodiments, through the interference fit of the rotating shaft 845 with the first through-hole 8424 and the second through-hole 8425, the rotating shaft 845 can be firmly installed to the slidable base 842, so that the operation stability of the rotating shaft 845 may be improved, and meanwhile the rotating shaft 845 may be prevented from being separated from the slidable base 842.

In some embodiments, the tension roller 844 may be installed in the first through-hole 8424 and the second through-hole 8425 of the slidable base 842 through one or more positioning shafts located at two ends of the tension roller 844. In order to improve the rotation flexibility of the tension roller 844, one or more rolling bearings may be provided in the first through-hole 8424 and the second through-hole 8425, and accordingly, the positioning shafts of the tension roller 844 may be installed in the inner rings of the rolling bearings.

In some embodiments, as shown in FIGS. 7B, 7D, and 7E, the diameter of the first through-hole 8424 may be smaller than that of the second through-hole 8425. In some embodiments, the slidable base 842 may include an annular or circular block reinforcement 8426. The block reinforcement 8426 may be located around the second through-hole 8425. In some embodiments, the block reinforcement 8426 may be formed on a side surface of the slidable base 842 away from the first through-hole 8424. After the rotating shaft 845 is installed, the block reinforcement 8426 may be melt and deformed, thereby fixing the rotating shaft 845 in the slidable base 842.

As illustrated above, the diameter of the first through-hole 8424 may be smaller than that of the second through-hole 8425, and the block reinforcement 8426 may be formed on a circumference of the second through-hole 8425 of the slidable base 842. After the rotating shaft 845 is installed, the block reinforcement 8426 may be melted and deformed by heating, and thus the second through-hole 8425 may be blocked by the melted block reinforcement 8426, and the rotating shaft 845 may be blocked in the slidable base 842. Therefore, the rotating shaft 845 may be prevented from being too loose to separate from the slidable base 842, after being rotated for a long time, the operation reliability of the tensioner 840 may be improved, and the utilization and the manufacturing efficiency of the belt driven system 700 may be improved.

In some embodiments, the fixed base 841, the slidable base 842, and the elastic member 843 may form the position adjusting device 354.

Figure 8A:
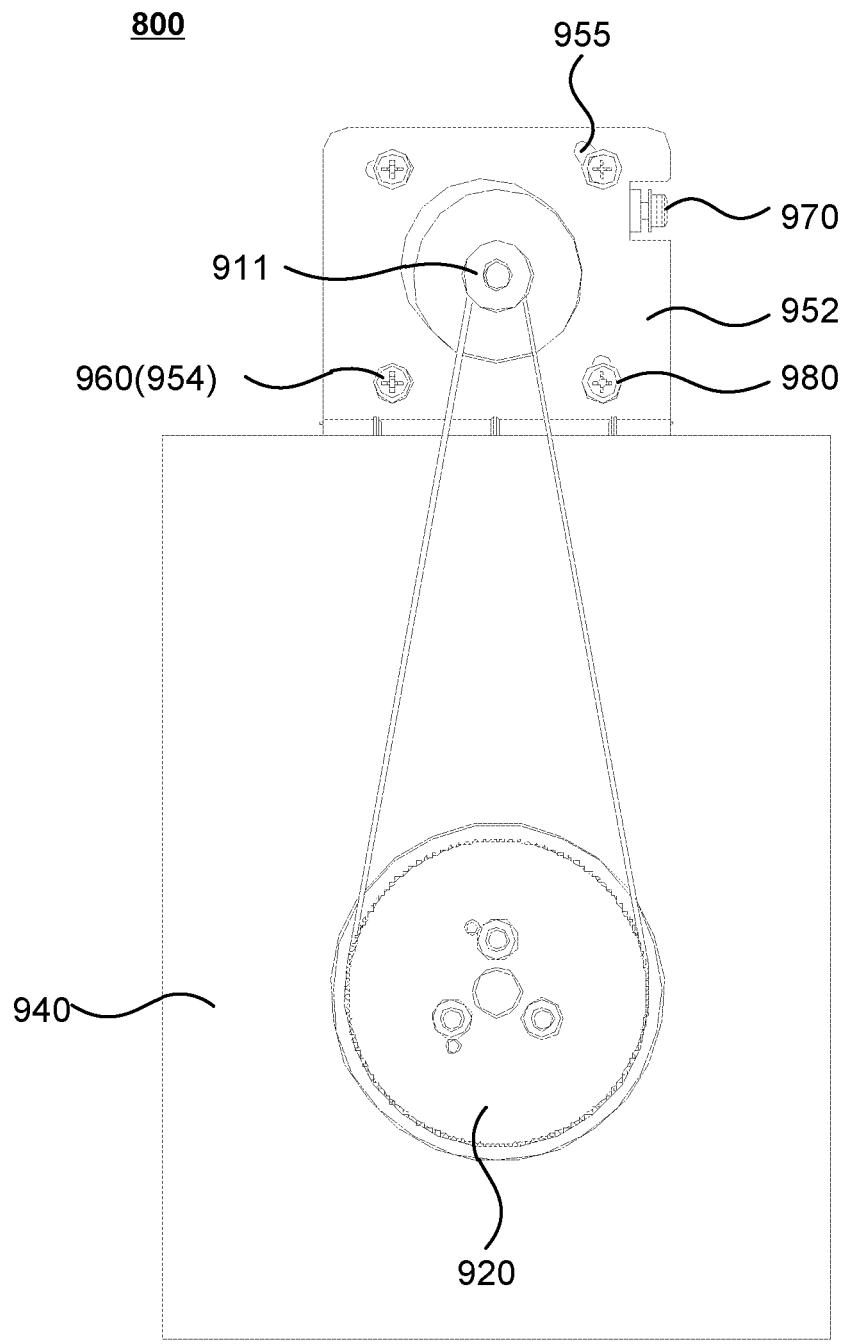
FIGS. 8A-8B illustrate an exemplary belt driven system according to some embodiments of the present disclosure.
Figure 8B:
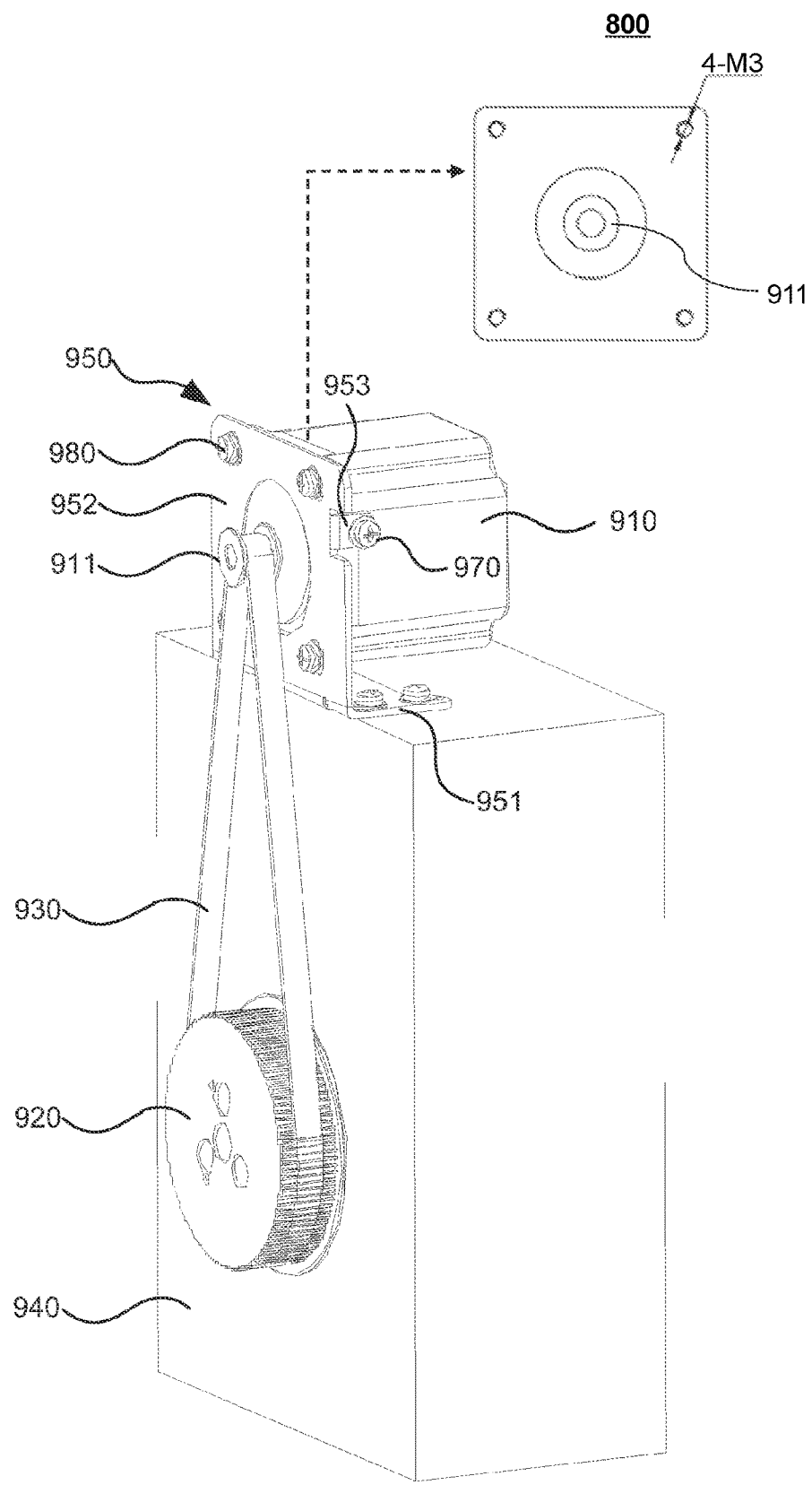

FIGS. 8A-8B illustrate an exemplary belt driven system 800 according to some embodiments of the present disclosure. The belt driven system 800 may include a belt 930 sleeving on a master pulley 911 of a motor 910 and a slave pulley 920. The belt driven system 800 may include a base 940 and a motor mounting bracket 950 fixed on the base 940. In some embodiments, the motor 910 of the belt driven system 800 may be pivotally mounted on the motor mounting bracket 950 via a pivot shaft 960 and may be locked relative to the motor mounting bracket 950. In some embodiments, the pivot shaft 960 may be parallel to a master shaft (or a central axis) of the motor 910. In some embodiments, the motor mounting bracket 950 may be provided with a tension screw 970 that is screwed towards the motor 910. In some embodiments, an end of the tension screw 970 may press against a side wall of the motor 910. In some embodiments, the motor 910 may pivot away from the slave pulley 920 around the pivot shaft 960 upon the tension screw being tensioned.

In some embodiments, in order to tension the belt 930, the tension screw 970 may be tweaked in a state where the motor 910 is rotatable relative to the motor mounting bracket 950, and the end of the tension screw 970 may exert a pushing force on the side wall of the motor 910, so that the motor 910 may rotate around the pivot shaft 960 towards a side away from the slave pulley 920. At this time, the center-to-center distance between the master pulley 911 and the slave pulley 920 of the motor 910 may increase, the belt 930 may be gradually tensioned. If the tension force of the belt 930 meets usage requirements, the motor 910 and the motor mounting bracket 950 may be relatively locked. Compared with the prior art, this solution reduces the difficulty of the tensioning operation. During the gradual tensioning of the belt 930, the resistance may increase gradually when the tension screw 970 is tweaked, and the tensioning condition of the belt 930 may be determined based on the operating intensity of tweaking the tension screw 970. Therefore, the sensitivity of the tension adjustment may be improved, and the belt 930 may be prevented from being damaged.

In some embodiments, the operating intensity of tightening the tension screw 970 may be determined based on actual experience, so that the tension condition of the belt 930 may be determined. It should be noted that the above description of the ways in which the motor mounting bracket 950 is fixed to the base 940 is merely provided for the purposes of illustration, and not intended to limit the scope of the present disclosure. For example, the motor mounting bracket 950 may be fastened by a fastener.

The specific structure of the motor mounting bracket 950 is not limited. In some embodiments, the motor mounting bracket 950 may be an L-shaped bracket. The motor mounting bracket 950 may include a first side plate 951 and a second side plate 952. In some embodiments, the base 940 may be fixed to a first side plate 951 of the L-shaped bracket. In some embodiments, an end surface of the motor 910 may pivotally mounted on the second side plate 952 of the L-shaped bracket and may be locked with the second side plate 952. In some embodiments, the side end of the second side plate 952 may include a ledge 953 extending in the axial direction of the motor 910. In some embodiments, a screw hole (not shown) for mounting the tension screw 970 may be provided on the ledge 953. With this technical solution, the structure of the motor mounting bracket 950 may be relatively simple and reliable.

The locking structure(s) of the motor 910 and the motor mounting bracket 950 are not limited. In some embodiments, the end surface of the motor 910 may be provided with one or more mounting holes. Accordingly, the motor 910 and the motor mounting bracket 950 may be relatively locked by one or more fastening bolts 980. As shown in FIG. 8B, the dotted arrow in points to a front view of the master pulley 911 which has four mounting holes with the size of M3 on the end surface of the motor 910.

In some embodiments, the number of mounting holes may be one. A through-hole may be provided at a position of the second side plate 952 corresponding to the mounting hole. A fastening bolt may be screwed into the mounting hole through the through-hole. In some embodiments, the through-hole may be a circular hole. If the fastening bolt is in a loosened state, the fastening bolt may be used as a pivot shaft. When the fastening bolt is loosened, the center-to-center distance between the master pulley 911 and the slave pulley 920 of the motor may be adjusted by rotating the motor 910 around the fastening bolt 980, so that the belt 930 may be tensioned. When the belt tension force meets usage requirements, the motor 910 and the motor mounting bracket 950 may be relatively locked by tightening the fastening bolt 980. With this technical solution, the structure of the belt tensioner may be simplified.

As shown in FIGS. 8A and 8B, the number of the mounting holes may be no less than two. A through-hole may be provided at a position of the second side plate 952 corresponding to each of the mounting holes. The fastening bolt(s) 980 may be screwed into the mounting hole(s) through the through-hole(s). The motor 910 may be reliably locked on the motor mounting bracket 950. The mounting position of the mounting hole on the end surface of the motor 910 is not limited. In some embodiments, at least two mounting holes may be provided along a circumference on the end surface of the motor 910. In this way, the fastening bolts 980 in different positions may provide the fastening force to the motor 910 simultaneously, so that the end surface of the motor 910 may be evenly loaded, and the motor 910 may be reliably and tightly locked on the motor mounting bracket 950.

In some embodiments, the through-holes may include one circular hole 954 and at least one waist-shaped hole 955. The fastening bolt 980 screwed into the mounting hole through the circular hole 954 may act as a pivot shaft 960 when the fastening bolt 980 is not fastened tightly. For each waist-shaped hole 955, a stud of the fastening bolt 980 screwed into a corresponding mounting hole through the waist-shaped hole 955 may slide in the waist-shaped hole 955 when the motor 910 rotates around the pivot shaft 960. With this technical solution, when the fastening bolt 980 is unscrewed, the center-to-center distance between the master pulley 911 and the slave pulley 920 of the motor 910 may be adjusted by the motor 910 rotating around the fastening bolt 980 passing through the circular hole 954, so that the belt 930 may be tensioned. In this process, the stud of the fastening bolt 980 screwed into the mounting hole through the waist-shaped hole 955 may slide in the waist-shaped hole 955 with the rotation of the motor 910, and the motor 910 and the motor mounting bracket 950 may be relatively locked by screwing all of the fastening bolts 980 when the tension force of the belt 930 meets usage requirements.

As shown in FIGS. 8A and 8B, a ledge 953 may be provided at the circular hole 954 near the second side plate 952. With the technical solution, since the point where the force applied to the side wall of the motor 910 by the tension screw 970 is relatively far away from the fastening bolt that acts as the pivot shaft 960, the driving torque applied to the motor 910 by the tension screw 970 may significantly increase when the same tweaking strength is applied. Therefore, the difficulty of the tensioning operation may be further reduced with this solution.

In some embodiments, the width of the waist-shaped hole 955 may be greater than the outer diameter of the corresponding stud of the fastening bolt 980. When the motor 910 rotates around the pivot shaft 960, the movement path of the fastening bolt 980 screwed into the mounting hole through the waist-shaped hole 955 is not an absolute straight line, and therefore, the width of the waist-shaped hole 955 may be appropriately enlarged to avoid interference with the stud of the fastening bolt 980 sliding in the waist-shaped hole 955, thereby improving the usage reliability of the belt tensioner. It should be noted that the width of the waist-shaped hole 955 may be smaller than the outer diameter of the bolt head of the fastening bolt 980, so as to lock the motor 910 and the motor mounting bracket 950. It should be noted that a shim may be provided between the bolt head of the fastening bolt and the motor mounting bracket 950, and in this case, it is needed to ensure that the diameter of the shim is larger than the width of the waist-shaped hole 955.

FIGS. 9A-9F illustrate an exemplary belt driven system 900 with a belt tensioner according to some embodiments of the present disclosure. The belt driven system 900 may include a base 1020 fixed on a fixed body 1010 of the belt driven system 900, an eccentric pulley 1030 for tensioning the belt, and a clamping structure provided between the base 1020 and the eccentric pulley 1030. In some embodiments, the eccentric pulley 1030 may be rotatably connected to the base 1020. In some embodiments, the clamping structure may be configured to clamp the eccentric pulley 1030 at one or more set positions.

The belt may be tensioned by the eccentric pulley 1030. Since an axial line of the eccentric pulley may not coincide with a centerline of the eccentric pulley 1030, the interference degree of the eccentric pulley 1030 with the belt may change with the rotation angle of the eccentric pulley 1030 during rotation. The belt tensioner may have simple structure and small occupation space, and may be operated conveniently.

Figure 9A:
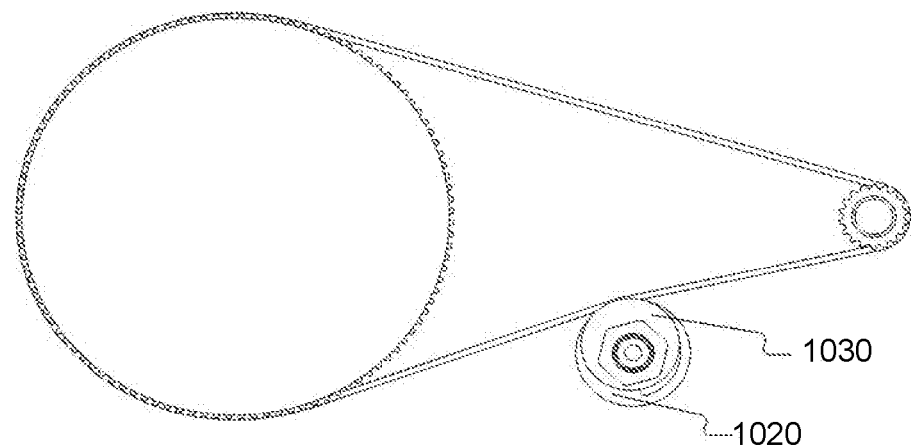
FIGS. 9A-9F illustrate an exemplary belt driven system with a belt tensioner according to some embodiments of the present disclosure.

As shown in FIG. 9A, the belt tensioner may include a base 1020, and an eccentric pulley 1030. In some embodiments, the base 1020 may be fixed on a fixed body 1010 of the belt driven system 900. The eccentric pulley 1030 may be rotatably connected to the base 1020. A clamping structure may be provided between the base 1020 and the eccentric pulley 1030. The clamping structure may be configured to clamp the eccentric pulley 1030 at a set position. An axial line of the eccentric pulley 1030 may not coincide with a centerline thereof, and the axial line and the centerline may have a preset distance therebetween. In a process of tensioning a belt, the belt may be in contact with a side wall of the eccentric pulley 1030, and a distance between the axial line and the belt may change with the rotation angle when the eccentric pulley 1030 rotates around the axial line thereof. It may be indicated that the interference degree of the eccentric pulley 1030 with the belt may change with the rotation of the eccentric pulley 1030, and thus, the tension force of the belt may meet requirements by rotating the eccentric pulley 1030 to an appropriate position and locking the eccentric pulley 1030 at this position by the clamping structure. The belt tensioner may adjust the tension force of the belt by rotating the eccentric pulley 1030 and fixing the eccentric pulley 1030 with respect to the base 1020 by the clamping structure. In this way, the belt tensioner may have simple structure and may be operated conveniently.

Figure 9B:
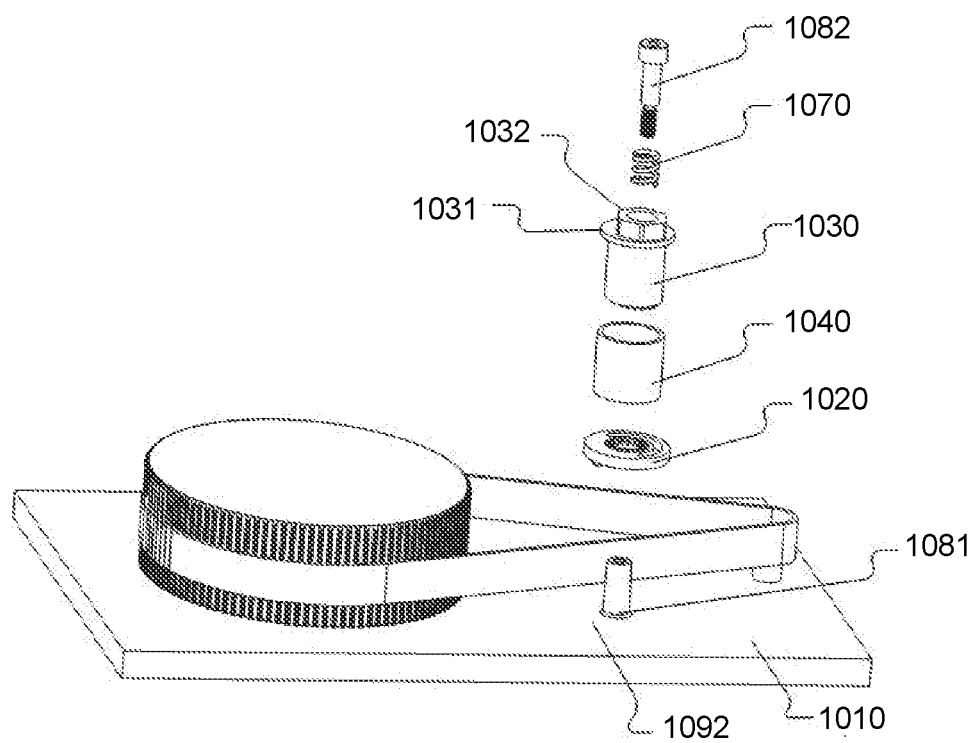

In some embodiments, the clamping structure may include a plurality of bumps and a plurality of catch grooves matching the bumps, and the bumps may form a circle. The clamping structure may clamp the eccentric pulley 1030 by the engagement between the bumps and the catch grooves. Specifically, the bumps may be provided on the eccentric pulley 1030, and the catch grooves may be provided on the base 1020. Alternately, the bumps may be provided on the base 1020, and the catch grooves may be provided on the eccentric pulley 1030. If the eccentric pulley 1030 rotates to an appropriate position, the bumps may be inserted in the catch grooves, so that the eccentric pulley 1030 cannot continue rotating due to the mutual engagement between the bumps and the catch grooves, and thus achieving clamping between the eccentric pulley 1030 and the base 1020. In some embodiments, the bumps may be column-shaped bumps or wedge-shaped bumps, or the like. As shown in FIGS. 9D-9F, the bumps may be wedge-shaped bumps 1051, and each wedge-shaped bump may have an inclined surface and a vertical surface. The wedge-shaped bumps 1051 may be provided on the eccentric pulley 1030 and arranged unidirectionally to form a circle. Correspondingly, the catch groove 1052 may also be wedge-shaped. An inner wall of the catch groove 1052 may have an inclined surface and a vertical surface, and the inclined surface of the wedge-shaped bump 1051 may press against the inclined surface of the catch groove 1052. Under the action of external force, the wedge-shaped bump 1051 may slide upwards along the inclined surface and fall into a next catch groove 1052. The eccentric pulley 1030 may rotate about the axial line with respect to the base 1020 unidirectionally to tension the belt. In this way, the rotation of the eccentric pulley 1030 can be better controlled by the engagement between the wedge-shaped bump(s) 1051 and the catch groove(s) 1052.

As shown in FIG. 9D, the engagement between the wedge-shaped bump 1051 and the catch groove 1051 may be illustrated. Both the wedge-shaped bump 1051 and the catch groove 1052 may have an inclined surface and a vertical surface. The inclined surface of the wedge-shaped bump 1051 may be engaged with that of the catch groove 1052, and the vertical surface of the bump 1051 may be engaged with that of the catch groove 1052. If a force is applied to the eccentric pulley 1030 in a counterclockwise direction, under the action of the force, the wedge-shaped bump 1051 may slide upwards along the inclined surface of the catch groove 1052 and fall into a next catch groove 1052. The above movement of the eccentric pulley 1030 may repeat one or more times, and the interference degree of the eccentric pulley 1030 with the belt may gradually increase, and thus, the tension force of the belt may gradually increase. If a force is applied to the eccentric pulley 1030 in a clockwise direction, the wedge-shaped bump 1051 may be obstructed by the vertical surface of the catch groove 1052, and the eccentric pulley 1030 cannot rotate. In this way, the eccentric pulley 1030 can only rotate unidirectionally under the engagement of the wedge-shaped bump(s) 1051 and the catch groove(s) 1052, and the eccentric pulley 1030 may be clamped to a set position when the external force is removed.

Figure 9C:
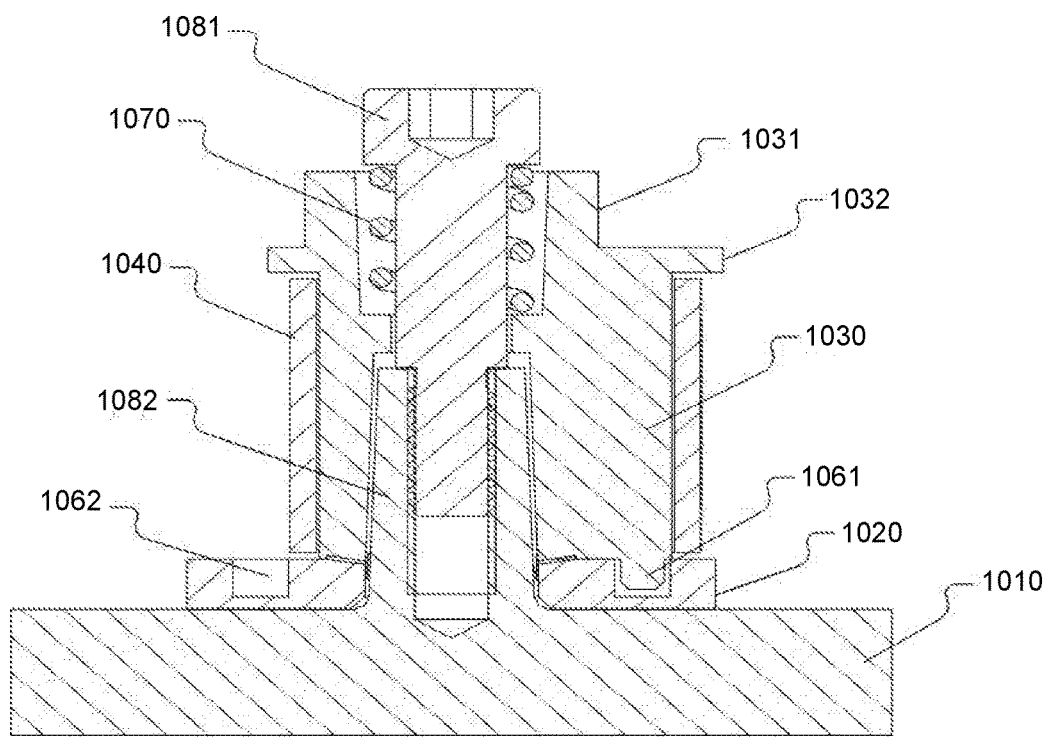
Figure 9D:
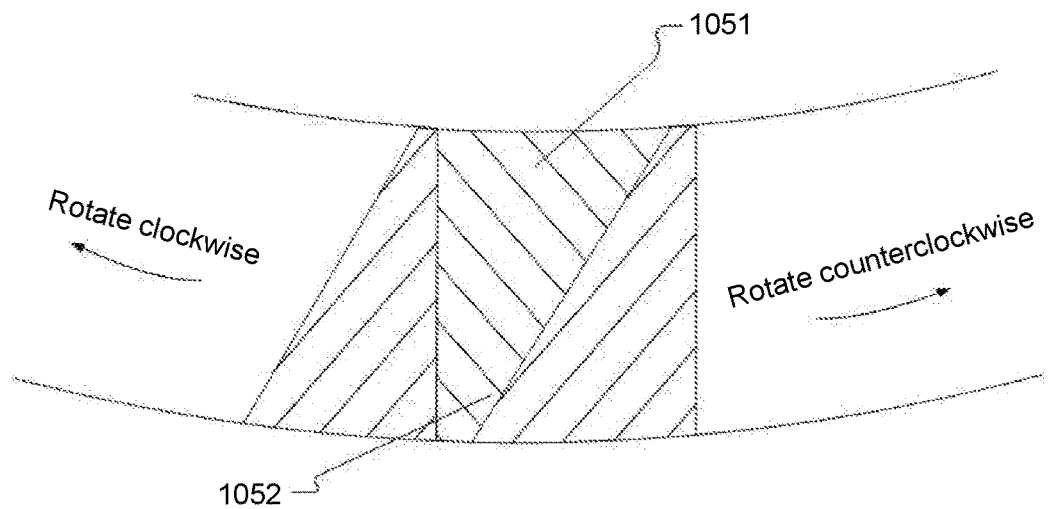
Figure 9E:
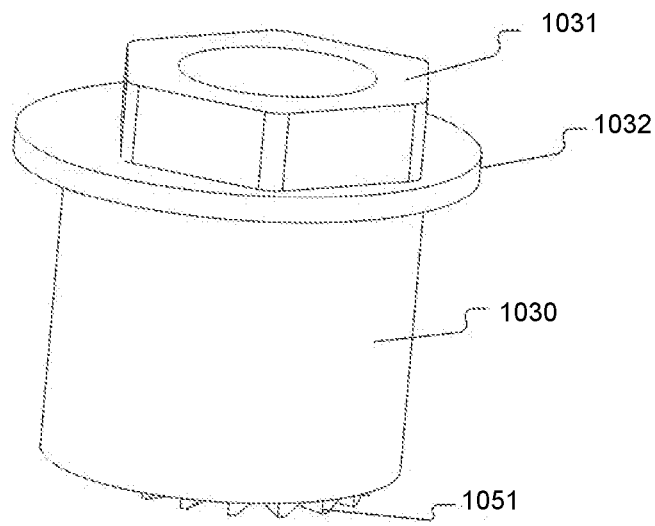
Figure 9F:
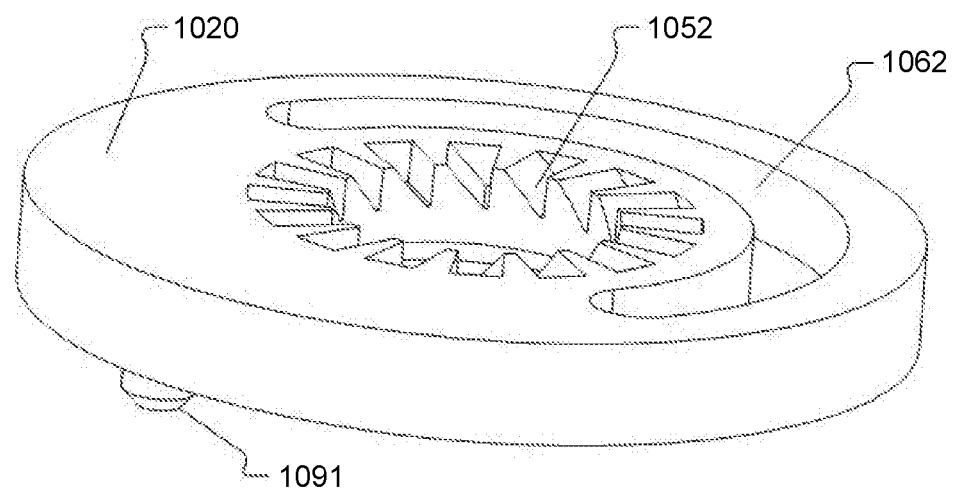

As shown in FIGS. 9C, 9E, and 9F, the eccentric pulley 1030 may include a limiting post 1061. The base 1020 may include an arc-shaped limiting groove 1062 matching the limiting post 1061. Alternatively, the base 1020 may be provided with the limiting post 1061, and the eccentric pulley 1030 may be provided with the arc-shaped limiting groove 1062 matching the limiting post 1061. When the eccentric pulley 1030 rotates around the axial line thereof, the limiting post 1061 may slide along the limiting groove 1062. The arc-shaped limiting groove 1062 may function as a guide, and an arc length that the limiting post 1061 can slide in the limiting groove 1062 may determine an angle that the eccentric pulley 1030 can rotate. In some embodiments, the limiting groove 1062 may be a semicircle groove. When the limiting post 1061 is located at one end of the limiting groove 1062, the distance from the axial line of the eccentric pulley 1030 to the belt may be minimized, and accordingly, the interference degree of the eccentric pulley 1030 with the belt may be minimized. If a force is applied to the eccentric pulley 1030 in a counterclockwise direction, the limiting post 1061 may slide along the limiting groove 1062 counterclockwise, and the interference degree of the eccentric pulley 1030 with the belt may gradually increase. If the limiting post 1061 slides to the other end of the limiting groove 1062, the eccentric pulley 1030 may have rotated about 180°, and the interference degree of the eccentric pulley 1030 with the belt may be maximized, and thus guaranteeing the belt tensioner to operate in a maximum adjustment range.

In order to reduce the friction between the belt and the eccentric pulley 1030 and avoid belt wear, the belt tensioner may further include a roller 1040. As shown in FIG. 9B, the roller 1040 may sleeve on the eccentric pulley 1030 and rotatably connected with the eccentric pulley 1030. When tensioning the belt, the belt may be in contact with the side wall of the roller 1040. In this way, the sliding friction between the belt and the eccentric pulley 1030 may be transformed into rolling friction between the belt and the roller 1040, and the belt wear may decrease effectively. In some embodiments, in order to restrict the movement of the roller 1040 along an axial direction of the eccentric pulley 1030, the eccentric pulley 1030 may be provided with a shoulder 1032 on a side wall at an end away from the base 1020. The roller 1040 may be assembled between the base 1020 and the shoulder 1032, so that the roller 1040 may only have a degree of freedom of rotation, and the stability of the roller 1040 may be improved. In addition, the eccentric pulley 1030 may also include a boss 1031 on an end surface thereof at an end away from the base 1020. A centerline of the boss 1031 may coincide with the axial line of the eccentric pulley 1030. If the eccentric pulley 1030 is rotated, a tool (e.g., a torque wrench) may be used to act on the boss 1031 and exert a counterclockwise force on the eccentric pulley 1030 to rotate the eccentric pulley 1030 so as to adjust the tension force of the belt. In order to facilitate the tool to clamp the boss 1031, as shown in FIG. 9E, the boss 1031 may have a hexagonal structure, in addition, the centerline of the boss 1031 may coincide with the axial line of the eccentric pulley 1030 during rotation, so that the relative position of the boss 1031 and the axial line may remain unchanged, and the application of a torque force to the boss 1031 may be facilitated.

In some embodiments, as shown in FIGS. 9B and 9C, the fixed body 1010 may include a first positioning post 1081, the base 1020 may include a first positioning hole, and the eccentric pulley 1030 may include a second positioning hole along the axial line direction thereof. The first positioning post 1081 may be inserted into the second positioning hole after passing through the first positioning hole. If the belt tensioner is fixed to the fixed body 1010, the first positioning post 1081 may have a positioning function. In some embodiments, the second positioning hole may be a through-hole, the first positioning post 1081 may include a threaded hole along the axial direction, and the belt tensioner may further include a threaded connector 1082 and a compression spring 1070. The threaded connector 1082 may be inserted in the second positioning hole and in threaded connection with the first positioning post 1081. The compression spring 1070 may sleeve on the threaded connector 1082 and may press against the eccentric pulley 1030. In some embodiments, the threaded connector 1082 may include a post body and an endcap provided on the post body, and the post body may be provided with a thread to be engaged with the threaded hole. For example, the threaded connector 1082 may be a bolt, a screw, or the like. The compression spring 1070 may press the eccentric pulley 1030 downwards, so that the friction force between the wedge-shaped bump 1051 and the catch groove 1052 may increase, and thus making engagement between the wedge-shaped bump 1051 and the catch groove 1052 more firmly. Besides, the compression spring 1070 may have a certain amount of compression, during the rotation of the eccentric pulley 1030, the wedge-shaped bump 1051 may slide along the inclined surface of the catch groove 1052, the eccentric pulley 1030 may be raised upwards and the compression spring 70 may be compressed again. Each wedge-shaped bump 1051 may fall into a next catch groove 1052. Due to the downward pressure of the compression spring 1070, the stability of the eccentric pulley 1030 during rotation may be increased. In an operation process of the belt, if the tension force is too large, the wedge-shaped bump 1051 may be separated from the catch groove 1052 by lifting the eccentric pulley 1030 upwards along the axial direction, the interference degree of the eccentric pulley 1030 with the belt may be decreased by rotating the eccentric pulley 1030 in a reverse direction, and if the eccentric pulley 1030 is rotated to an appropriate position, the wedge-shaped bump 1051 may be re-engaged with the catch groove 1052.

As shown in FIG. 9C, the second positioning hole may be provided with a step structure on an inner wall thereof, and the compression spring 1070 may press against a step surface of the step structure. If the threaded connector 1082 is screwed in the threaded hole of the first positioning post 1081, a distance between the endcap and the step structure may gradually decrease and the compression spring 1070 may be compressed until assembly requirements are met. If the pre-compression degree of the compression spring 1070 is too large, it may be difficult for the eccentric pulley 1030 to rotate. If the pre-compression degree of the compression spring 1070 is too small, the pressure provided by the compression spring 1070 on the eccentric pulley 1030 may be insufficient, and the stability of the eccentric pulley 1030 during rotation may be influenced. Therefore, in order to guarantee that the compression spring 1070 has an appropriate pre-compression degree, an engagement depth of the threaded connector 1082 and the threaded hole may be controlled. In some embodiments, the post body of the threaded connector 1082 may include two parts (i.e., a first post body and a second post body). The second post body may be provided with a thread on a side wall thereof, and the engagement depth of the threaded connector 1082 and the first positioning post 1081 may be controlled by adjusting a length of the second post body. The length of the second post body may be adjusted such that the pre-compression degree of the compression spring 1070 may exactly meet requirements when the second post body is screwed into the threaded hole of the first positioning post 1081. In some embodiments, a diameter of the first post body may be larger than that of the second post body, and the first positioning post 1081 may press against an end surface of the first post body. For example, the threaded connector 1082 may be a shoulder screw. In addition, a depth of the threaded hole in the first positioning post 1081 may be adjusted such that the pre-compression degree of the compression spring 1070 may exactly meet requirements when the threaded connector 1082 is screwed to a bottom end of the threaded hole in the first positioning post 1081.

The compression spring 1070 may provide a downward force on the eccentric pulley 1030, which may make the eccentric pulley 1030 more stable during rotation. The compression spring 1070 may be set in other forms. In some embodiments, the second positioning hole may be a through-hole. The first positioning post 1081 may pass through the second positioning hole and have an end of the first positioning post 1081 exposed. A side wall of the exposed end of the first positioning post 1081 may be provided with a thread. The belt tensioner may further include a screw nut and the compression spring 1070. The screw nut may be in threaded connection with the first positioning post 1081, and the compression spring 1070 may sleeve on the first positioning post 1081 and press against the eccentric pulley 1030. The engagement of the compression spring 1070, the screw nut, and the eccentric pulley 1030 may be the same as that illustrated in the structures shown in FIG. 9C, and will not be repeated herein.

In some embodiments, in order to facilitate fixing of the belt tensioner on the fixed body 1010, the fixed body 1010 may be further provided with a second positioning post 1091, the base 20 may be provided with a third positioning hole 1092, and the second positioning post 1091 may be inserted into the third positioning hole 1092. Alternatively, the base 1020 may be provided with the second positioning post 1091, the base 1020 may be provided with the third positioning hole 1092, and the second positioning post 1091 may be inserted into the third positioning hole 1092. In this way, the belt tensioner may be fixed on the fixed body 1010 by the engagement of the first positioning post 1081 and the first positioning hole, and the matching between the second positioning post 1091 and the third positioning hole 1092. This assembly has simple structure, and the operation(s) in assembly and disassembly may be facilitated.

As can be seen from the above description, in some embodiments, the belt may be tensioned by the eccentric pulley 1030. A side wall of the eccentric pulley 1030 may be in contact with the belt. Since an axial line of the eccentric pulley 1030 does not coincide with a centerline thereof, and the distance between the axial line and the centerline has a preset value, the interference degree of the eccentric pulley 1030 with the belt may change with the rotation angle of the eccentric pulley 1030 during rotation. The belt tensioner is simple in structure, small in occupation space, and convenient in operation.

In some embodiments, the base 1020 and the clamping structure may form the position adjusting device 354.

Figure 10A:
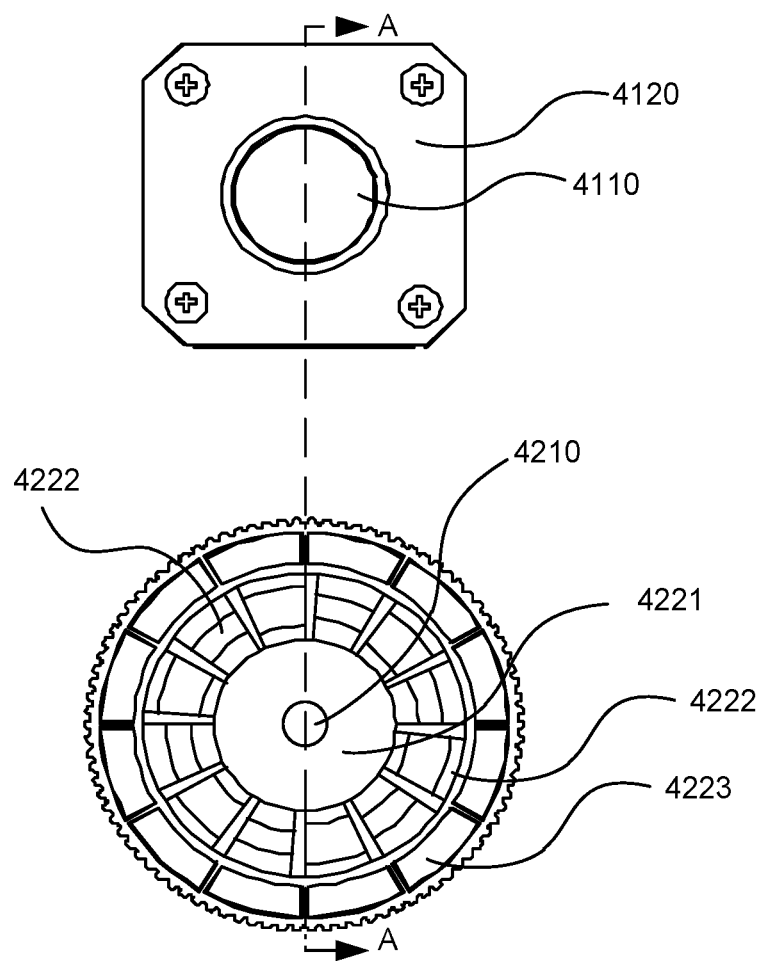
FIG. 10A is a schematic diagram of a belt driven system without a separate belt tensioner according to some embodiments of the present disclosure.
Figure 10B:
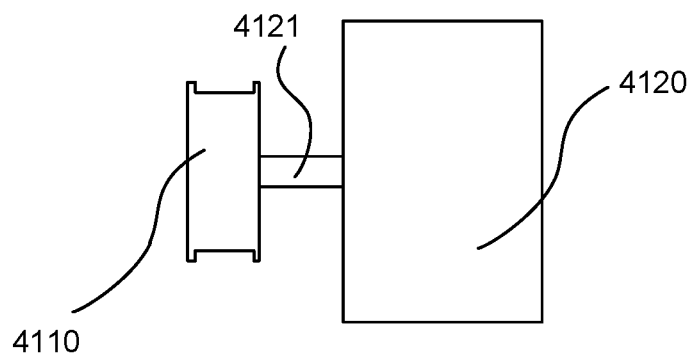
FIG. 10B is a cross sectional view along a line A-A of FIG. 10A according to some embodiments of the present disclosure.
Figure 10B:
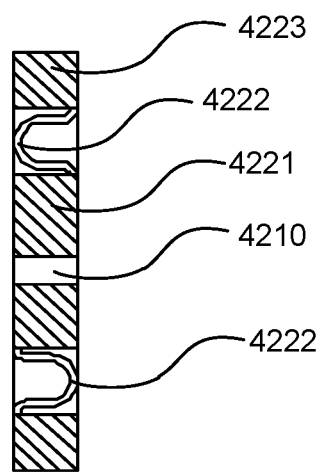
Figure 10C:
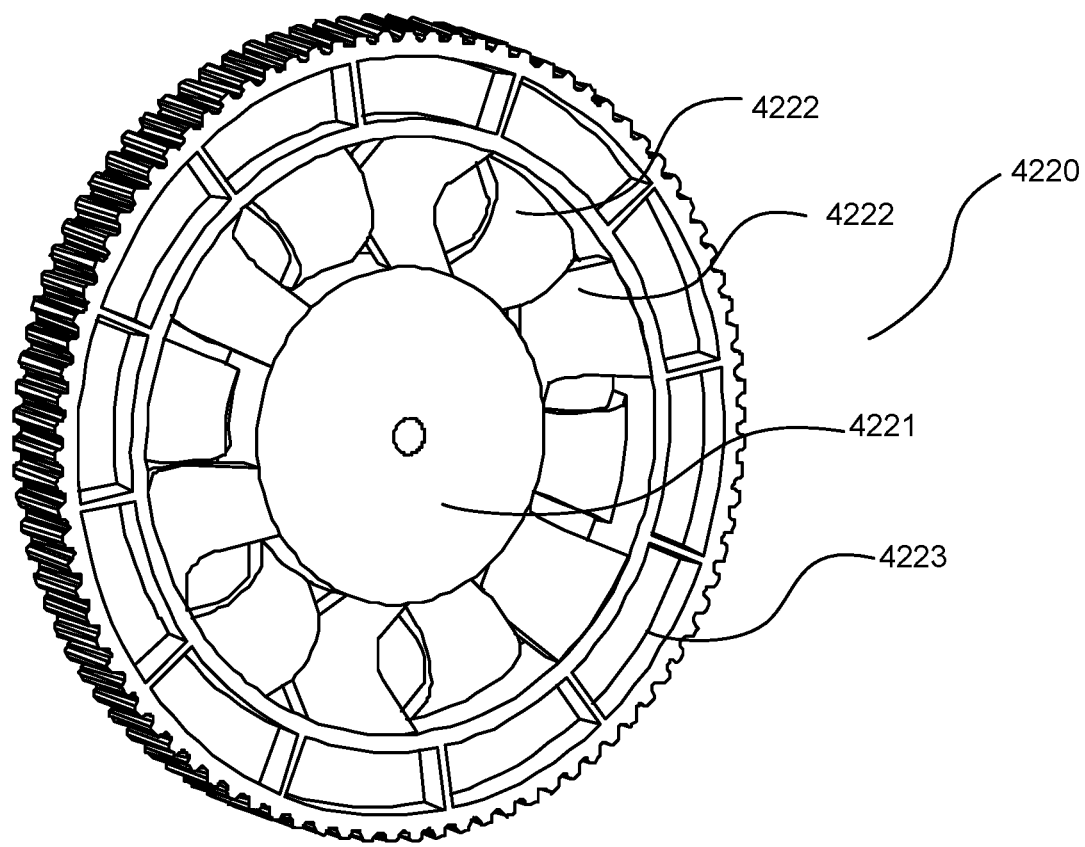
FIG. 10C is a schematic diagram of a slave pulley of the belt driven system shown in FIG. 10A according to some embodiments of the present disclosure.
Figure 10D:
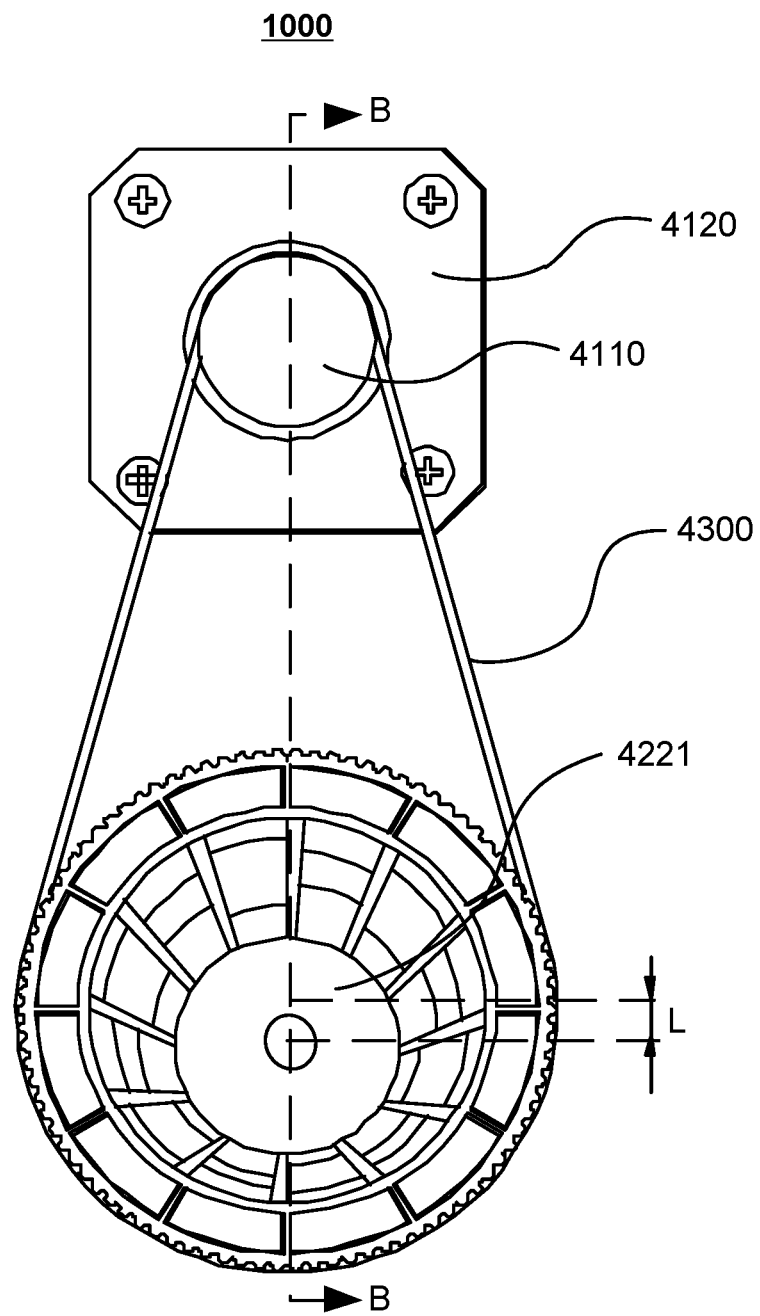
FIG. 10D is a schematic diagram of the belt driven system shown in FIG. 10A mounted with a belt thereof according to some embodiments of the present disclosure.
Figure 10E:
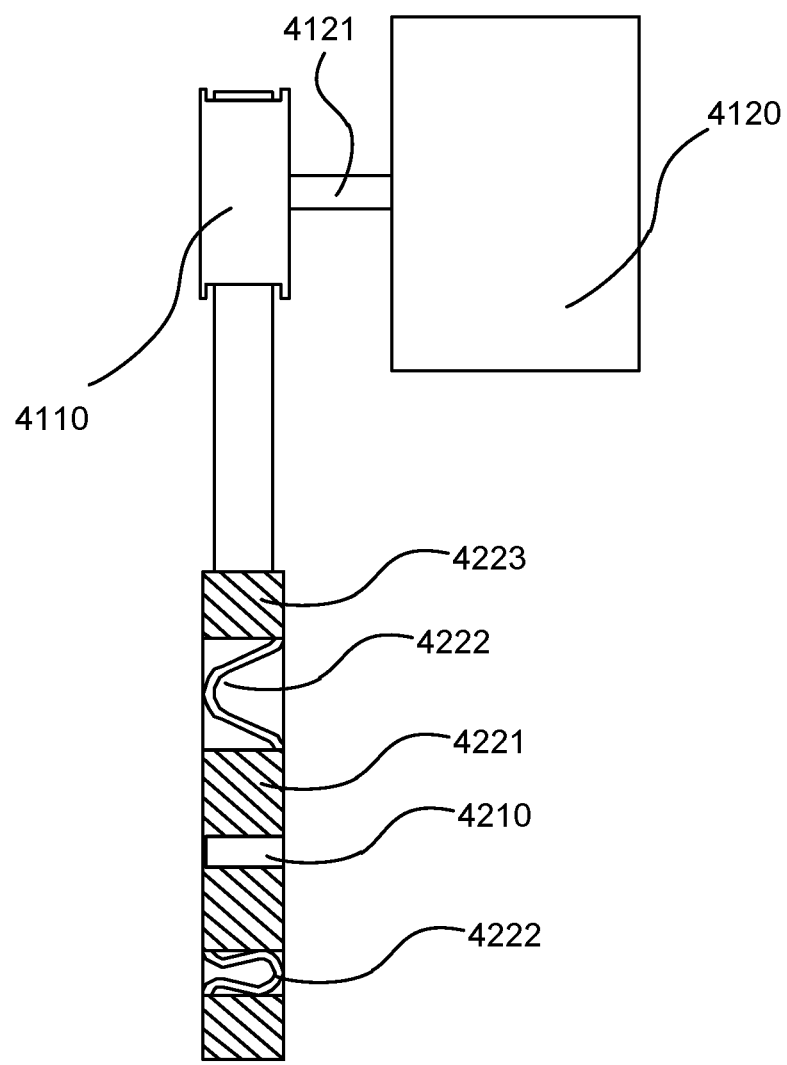
FIG. 10E is a cross sectional view along a line B-B of FIG. 10D according to some embodiments of the present disclosure.

FIGS. 10A-10E illustrate an exemplary pulley system 1000 without a belt tensioner according to some embodiments of the present disclosure. FIG. 10A is a schematic diagram of a pulley system 1000 without a separate belt tensioner according to some embodiments of the present disclosure. FIG. 10B is a cross sectional view along a line A-A of FIG. 10A according to some embodiments of the present disclosure. FIG. 10C is a schematic diagram of a slave pulley 4220 of the pulley system 1000 shown in FIG. 10A according to some embodiments of the present disclosure. FIG. 10D is a schematic diagram of the pulley system 1000 shown in FIG. 10A mounted with a belt 4300 thereof according to some embodiments of the present disclosure. FIG. 10E is a cross sectional view along a line B-B of FIG. 10D according to some embodiments of the present disclosure.

In some embodiments, the pulley system 1000 may include a pulley. In some embodiments, the pulley may include an outer ring, an inner ring, and an elastic part. In some embodiments, the elastic part may be configured to deform under a force along a target radial direction of the inner ring so that the outer ring substantially moves along the radial direction with respect to the inner ring. In some embodiments, the elastic part may be located between the inner ring and the outer ring. In some embodiments, the pulley may be a first pulley, and the pulley system 1000 may further include a second pulley and a belt connecting an outer periphery of the first pulley and an outer periphery of the second pulley. In some embodiments, one of the first pulley and the second pulley may serve as a slave pulley and the other one of the first pulley and the second pulley may serve as a master pulley. In some embodiments, the slave pulley may have an integral molding structure made of a plastic material. In some embodiments, the pulley system 1000 may further include a master shaft connected to the master pulley to drive the master pulley to rotate, and a slave shaft located parallel to the master shaft and connected to the slave pulley via the shaft hole of the slave pulley formed by an inner periphery of the inner ring. In some embodiments, the shaft hole may be co-axial with the outer periphery of the slave pulley and/or the inner periphery of the inner ring. In some embodiments, a maximum displacement of a rotation axis of the outer ring of the first pulley moving towards a rotation axis of the second pulley may range from 1.5% to 3% of a distance between the master shaft and the slave shaft. In some embodiments, the elastic part may allow, upon recovering from a deformation, a rotation axis of the outer ring of the first pulley to move away from a rotation axis of the second pulley.

In some embodiments, the elastic part may include a plurality of axisymmetric elastic members. Each elastic member may have a first end and a second end axisymmetrically distributed relative to a symmetric axis. The first end and the second end may be connected to an outer periphery of the inner ring and an inner periphery of the outer ring respectively. The first end and the second end may form an opening therebetween. Two openings of two adjacent elastic members may be in opposite directions. In some embodiments, each of the plurality of axisymmetric elastic members may be U-shaped, and two arms of the U-shape may respectively correspond to the first end and the second end of the elastic member. In some embodiments, each of the plurality of axisymmetric elastic members may be V-shaped, and two arms of the V-shape may respectively correspond to the first end and the second end of the elastic member. In some embodiments, a number of the plurality of axisymmetric elastic members may be an even number.

In some embodiments, the elastic part may include a plurality of centrosymmetric elastic members. Each elastic member may have a first end and a second end centrosymmetrically distributed relative to a symmetric center. The first end and the second end may be connected to an outer periphery of the inner ring and an inner periphery of the outer ring respectively. The first end and the second end may form two openings in opposite directions therebetween. In some embodiments, each of the plurality of centrosymmetric elastic members may be S-shaped, and the two arms of the S-shape may respectively correspond to the first end and the second end of the elastic member. In some embodiments, each of the plurality of centrosymmetric elastic members may be Z-shaped, and the two arms of the Z-shape may respectively correspond to the first end and the second end of the elastic member.

In some embodiments, the elastic part may include a rubber ring between the outer ring and the inner ring.

Merely by way of example, as shown in FIG. 10D, the pulley system 1000 may include a master pulley 4110, a slave pulley 4220, a belt 4300, a motor 4120 configured for driving the master pulley 4110, in which an outer periphery of the master pulley 4110 and an outer periphery of the slave pulley 4220 may be driven to transmit via the belt 4300. In some embodiments, the slave pulley 4220 may include an elastic part 4222. In some embodiments, the elastic part 4222 may deform under a tension force applied by the belt 4300 and allow the outer periphery of the slave pulley 4220 to move towards the master pulley 4110. In some embodiments, the elastic part 4222 may recover from a deformation and allow the outer periphery of the slave pulley 4220 to move away from the master pulley 4110.

The belt driven system may include a master pulley 4110, a slave pulley 4220, a belt, and a motor 4120 configured for driving the master pulley 4110. An outer periphery of the master pulley 4110 and an outer periphery of the slave pulley 4220 may be driven to transmit via a tensioned belt. The slave pulley 4220 may include an elastic part 4222. The elastic part 4222 may deform under a tension force applied by the belt 4300 and allow the outer periphery of the slave pulley 4220 to move towards to the master pulley 4110. The elastic part 4222 may recover from a deformation and allow the outer periphery of the slave pulley 4220 to move away from the master pulley 4110. In this way, the outer periphery of the slave pulley 4220 may be driven to approach the master pulley 4110 by deformation of the elastic part 4222, so that a tension degree of the tensioned belt may autonomously decrease, and the belt 4300 may not break for being too tight. The outer periphery of the slave pulley 4220 may be driven to move away from the master pulley 4110 when the elastic part 4222 recovers from deformation, so that the tension degree of the tensioned belt may autonomously increase, and the belt 4300 may not slip for being too loose. In an operation process of the belt driven system of the present disclosure, the belt 4300 may be shorten or elongated because of environment temperature or self-temperature reduction, and a pressure applied to an outer ring of the slave pulley 4220 by the belt 4300 may accordingly change. In this case a distance between the outer periphery of the slave pulley 4220 and the master pulley 4110 may be changed by the elastic part 4222, and the tension degree of the tensioned belt may be autonomously adjusted. In the belt driven system of the present disclosure, autonomous adjustment of the tension degree of the belt 4300 may be realized by the deformation of the elastic part 4222 of the slave pulley 4220 without artificial adjustment. Compared with the prior art, a separate tension pulley is unnecessary, and the structure of the belt driven system is simplified.

Specifically, as shown in FIGS. 10A-10E, the slave pulley 4220 may further include an inner ring 4221 and an outer ring 4223, and the elastic part 4222 may be connected between the inner ring 4221 and the outer ring 4223. For example, the elastic part 4222 may be a mechanism that can elastically deform. For example, the elastic part 4222 may be an elastic ring (e.g., rubber ring, or metal ring with a U-shape cross section) or a spring mechanism. As shown in FIG. 10B, the elastic part 4222 may be a plurality of U-shape springs connecting between the outer ring 4223 and the inner ring 4221, wherein the plurality of U-shape springs are arranged to be alternatively facing towards different sides of the slave pulley 4220. In such a way, the structure of the slave pulley 4220 is simplified and the manufacture is convenient.

More specifically, as shown in FIGS. 10A-10E, the pulley system 1000 may include a master shaft 4121 connected to the master pulley 4110 to drive the master pulley 4110 to rotate; the pulley system 1000 may further include a slave shaft 4210 located parallel to the master shaft 4121; a shaft hole of the slave pulley 4220 may be formed by an inner periphery of the inner ring 4221 and may be engaged with the slave shaft 4210. The slave shaft 4210 may be connected to the slave pulley 4220 via the shaft hole.

The elastic part 4222 may deform under a tension force applied by the belt 4300 to allow a rotation axis of the outer ring 4223 to move towards the master shaft 4121 of the motor 4120 along a direction parallel to a plane formed by the master shaft 4121 of the motor 4120 and the slave shaft 4210. The rotation axis of the outer ring 4223 may parallelly approach the master shaft of the motor 4120 for a distance represented as L in FIG. 10D. The elastic part 4222 may recover from deformation to allow the rotation axis of the outer ring 4223 to move away from the master shaft 4121 of the motor 4120 along the direction parallel to the plane formed by the master shaft 4121 of the motor 4120 and the slave shaft 4210.

In some embodiments, an exemplary assembling process of the pulley system 1000 may include one or more of the following operations. The master pulley 4110 may be fixed to a drive shaft of the motor 4120, and thus the master shaft 4121 of the motor 4120 may drive the master pulley 4110 to rotate when the motor 4120 is in operation. The slave shaft 4210 may be set to be parallel to the master shaft 4121 of the motor 4120. The slave shaft 4210 may be fixed to the shaft hole of the inner ring 4221 of the slave pulley 4220, and thus the slave pulley 4220 may drive the slave shaft 4210 to rotate, as shown in FIGS. 10A and 10B. A distance between the drive shaft of the master pulley 4110 and a rotating shaft of the outer ring 4223 of the slave pulley 4220 may be equal to a distance between the drive shaft of the master pulley 4110 and the slave shaft 4210. Then the outer periphery of the outer ring 4223 and the outer periphery of the master pulley 4110 may be driven by the tensioned belt. The tensioned belt may apply a pressure on the slave pulley 4220, the elastic part 4222 may deform to allow the rotating shaft of the outer ring 4223 to move towards the master shaft 4121 of the motor 4120 along the direction parallel to the plane formed by the master shaft 4121 of the motor 4120 and the slave shaft 4210, as shown in FIGS. 10D and 10E. The distance between the drive shaft of the master pulley 4110 and the rotating shaft of the outer ring 4223 of the slave pulley 4220 becomes smaller than the distance between the drive shaft of the master pulley 4110 and the slave shaft 4210. In this way, the elastic part 4222 may deform and allow the rotating shaft of the outer ring 4223 to move towards the master shaft 4121 of the motor 4120 along a direction parallel to the plane formed by the master shaft 4121 of the motor 4120 and the slave shaft 4210, so that the tension degree of the tensioned belt may autonomously decrease, and the belt 4300 may not break for being too tight. The belt 4300 may become longer due to environment temperature or self-temperature increase or being used for a relative long time. As a result, the pressure applied to the outer ring 4223 by the belt 4300 may become small. The elastic part 4222 may recover from the deformation and allow the rotating shaft of the outer ring 4223 to move away from the master shaft 4121 of the motor 4120 in the direction parallel to the plane formed by the master shaft 4121 of the motor 4120 and the slave shaft 4210. It is indicated that the distance between the drive shaft of the master pulley 4110 and the rotating shaft of the outer ring 4223 of the slave pulley 4220 may become larger, but may be still smaller than the distance between the drive shaft of the master pulley 4110 and the slave shaft 4210. Therefore, the length of the belt 4300 may increase slightly, and the tension degree of the tensioned belt can be autonomously adjusted.

In some embodiments, the elastic part 4222 may include one or more elastic members. An elastic member may be made of one or more materials including, for example, a thermoset rubber, a thermoplastic elastomer (TPE), etc. A thermoset rubber may include, for example, a natural rubber (NR), a polyisoprene rubber (IR), a polychloroprene rubber (CR), a styrene butadiene rubber (SBR), a nitrile butadiene rubber (NBR), an ethylene propylene diene monomer rubber (EPDM), a polybutadiene rubber (BR), an epichlorohydrin rubber (ECO), a fluorinated hydrocarbonbutyl rubber (FKM), a silicone rubber, etc. A thermoplastic elastomer may include a styrenic block copolymer (TPS), a thermoplastic polyolefinelastomer (TPO), a thermoplastic vulcanizate (TPV), a thermoplastic polyurethane (TPU), a hermoplastic copolyester (TPC), a thermoplastic polyamide (TPA), a not classified thermoplastic elastomer (TPZ), etc. In some embodiments, each of the one or more elastic members may be made of the same materials. In some embodiments, the one or more elastic members may be made of different materials. For example, a first elastic member may be made of a thermoset rubber, while a second elastic member may be made of a thermoplastic elastomer. In some embodiments, the elastic members made of different materials may be placed alternately. In some embodiments, one or more of the elastic members may have a curved shape including one or more openings. Exemplary curved shapes may include U shape, V shape, S shape, Z shape, X shape, M shape, C shape, etc. In some embodiments, each of the one or more elastic members may have the same shape. In some embodiments, the one or more elastic members may have different shapes. For example, a first elastic member may have a U shape, while a second elastic member may have an S shape. In some embodiments, the elastic members having different shapes may be placed alternately.

In some embodiments, the one or more elastic members may be placed axisymmetrically. In some embodiments, an elastic member may include a first end and a second end axisymmetrically distributed relative to a symmetric axis (e.g., the center axis of the shaft hole of the inner ring 4221 of the slave pulley 4220). In some embodiments, the first end and the second end may be connected to an outer periphery of the inner ring 4221 and an inner periphery of the outer ring 4223, respectively. In some embodiments, the first end and the second end may form an opening therebetween. In some embodiments, two openings of two adjacent elastic members may be in opposite directions.

In some embodiments, the one or more elastic members may be placed centrosymmetrically. In some embodiments, an elastic member may include a first end and a second end centrosymmetrically distributed relative to a symmetric center (e.g., the center axis of the shaft hole of the inner ring 4221 of the slave pulley 4220). In some embodiments, the first end and the second end may be connected to an outer periphery of the inner ring 4221 and an inner periphery of the outer ring 4223, respectively. In some embodiments, the first end and the second end may form two openings in opposite directions therebetween.

Merely by way of example, as shown in FIGS. 10A-10E, the elastic part 4222 of the slave pulley 4220 may include an even number of U-shaped elastic members. Two ends of two arms of each U-shaped elastic member may be fixed to the outer periphery of the inner ring 4221 and the inner periphery of the outer ring 4223, respectively. Adjacent U-shaped elastic members may have openings in opposite directions. The elastic part 4222 may ensure that the belt 4300 suffers a uniform stress when the outer periphery of the outer ring 4223 suffers a stress from the belt 4300, and thus, deviation or uneven wear of the belt 4300 may be avoided.

It should be noted that the U-shaped elastic member is merely provided as an example. The elastic member may also be V-shaped. Two ends of two arms of the V-shaped elastic member may be fixed to the outer periphery of the inner ring 4221 and the inner periphery of the outer ring 4223, respectively. Adjacent V-shaped elastic members may have openings in opposite directions, and the belt 4300 may suffer a uniform stress. Similarly, the shape of the elastic member may not be limited to the U shape or the V shape. A first end and a second end of each of an even number of elastic members may be symmetrically distributed about a symmetric axis. An opening may be formed between the first end and the second end. The first end and the second end of the elastic member may be fixed to the outer periphery of the inner ring 4221 and the inner periphery of the outer ring 4223, respectively. Adjacent elastic members may have openings in opposite directions. Such elastic members may ensure a uniform force on the belt 4300.

In some embodiments, for a U-shaped or V-shaped elastic member, the first end and the second end of the each elastic member may correspond to two ends of two arms of the U-shaped or V-shaped elastic member, respectively.

As another possible form of the elastic part 4222, the elastic part 4222 may also include a plurality of centrosymmetric elastic members. A first end and a second end of each elastic member may be symmetrically distributed about a symmetric center. Two openings with opposite opening directions may be formed between the first end and the second end of the elastic member. The first end and the second end of the elastic member may be fixed to the outer periphery of the inner ring 4221 and the inner periphery of the outer ring 4223, respectively. If the elastic members are S-shaped elastic members, two ends of two arms of each S-shaped elastic member may correspond to the first end and the second end. If the elastic member are Z-shaped elastic members, two ends of two arms of each Z-shaped elastic member may correspond to the first end and the second end. The elastic parts 4222 of the slave pulleys 4220 mentioned above can provide uniform stress on the belt 4300.

Specifically, in some embodiments, the slave pulley 4220 may have an integral molding structure. In this way, the integral molding structure of the slave pulley 4220 may not require assembling. Therefore, the manufacture of the slave pulley 4220 and the assembling of the belt driven system may be facilitated.

Specifically, in some embodiments, the slave pulley 4220 may be made of a plastic material.

Specifically, in some embodiments, the movement of the rotation axis of the outer ring 4223 (e.g., of the slave pulley 4220) towards a rotation axis of the second pulley (e.g., the master pulley 4110) along the direction parallel to the plane formed by the master shaft 4121 of the motor 4120 and the slave shaft 4210 may have a maximum displacement. In some embodiments, the maximum displacement may range from 1.5% to 3% of the distance between the master shaft 4121 of the motor 4120 and the slave shaft 4210. Correspondingly, if the displacement of movement of the rotation axis of the outer ring 4223 towards the master pulley 4110 along the direction parallel to the plane formed by the master shaft 4121 of the motor 4120 and the slave shaft 4210 equals the maximum displacement, the tension force generated on the belt 4300 may be smaller than a maximum tension that the belt 4300 can bear.

Specifically, in some embodiments, the outer periphery of the master pulley 4110 and the outer periphery of the outer ring 4223 of the slave pulley 4220 may be provided with gears engaged with the belt 4300.

In some embodiments, the pulley 1000 illustrated in FIGS. 10A-10E may further include a separate belt tensioner. The tensioner may be configured to generate tension in the belt 4300. More descriptions of exemplary belt tensioner may be found elsewhere in the present disclosure (e.g., FIGS. 4A-4D, 5A-5D, 7A-7E, and 9A-9F and the descriptions thereof).

It should be noted that the above description of the belt driven system is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the slave pulley 51, the slave pulley 73, the slave pulley 820, the slave pulley 920, the slave pulley shown in FIG. 5A, and/or the slave pulleys shown in FIGS. 9A and 9B may be replaced by the slave pulley 4220 shown in FIGS. 10A-10E.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A belt driven system, comprising:
a tensioner for tensioning a belt, including:
a base; and
a motor mounting bracket fixed on the base and configured to pivotally mount a motor via a pivot shaft and lock the motor via at least one tension screw, wherein
the motor mounting bracket is an L-shaped bracket including a first side plate and a second side plate,
the base is fixed to the first side plate,
an end surface of the motor is pivotally mounted on the second side plate and is locked relative to the second side plate,
a side end of the second side plate includes a ledge extending towards an axial direction of the motor,
the ledge is provided with a screw hole for mounting the at least one tension screw,
the pivot shaft is parallel to a central axis of the motor,
the at least one tension screw is screwed towards the motor,
an end of the at least one tension screw presses against a side wall of the motor,
the motor pivots away from a slave pulley of the belt driven system around the pivot shaft upon the at least one tension screw being tensioned,
the motor and the motor mounting bracket are relatively locked by one or more fastening bolts,
the end surface of the motor is provided with one or more mounting holes, the motor mounting bracket is provided with one or more through-holes at one or more positions corresponding to the one or more mounting holes, and the one or more fastening bolts are screwed into the one or more mounting holes through the one or more through-holes, the one or more through-holes include one circular hole and at least one waist-shaped hole, and
one of the one or more the fastening bolts is configured to act as the pivot shaft when said fastening bolt is screwed into one of the one or more mounting holes through the circular hole and is not fastened tightly, and when the motor rotates around the pivot shaft, a stud of each of the one or more fastening bolts screwed into the one or more corresponding mounting hole through each of the at least one waist-shaped hole slides in each of the at least one waist-shaped hole.

2. The system of claim 1, wherein the second side plate is provided with the one or more through-holes at one or more positions corresponding to the one or more mounting holes.

3. The system of claim 2, wherein a count of the one or more mounting holes is larger than 1, and the one or more mounting holes are provided along a circumference on the end surface of the motor.

4. The system of claim 1, wherein the circular hole is provided close to a side of the second side plate opposite to the side end with the ledge.

5. The system of claim 1, wherein the circular hole is provided close to a side of the second side plate opposite to the side end with the ledge.

6. The system of claim 1, wherein the belt driven system includes:
a master pulley;
the slave pulley including an elastic part; and
the belt connecting an outer periphery of the master pulley and an outer periphery of the slave pulley,
wherein the elastic part is configured to deform under a tension force of the belt to allow the outer periphery of the slave pulley to move towards the master pulley.

* * * * *